United States Patent
Murakami et al.

[11] Patent Number: 6,144,891
[45] Date of Patent: Nov. 7, 2000

[54] WRENCHING METHOD AND APPARATUS, WRENCHING ATTACHMENT, AND MEDIUM STORING WRENCHING TORQUE CONTROL PROGRAM

[75] Inventors: Yukitaka Murakami, Fukuoka; Kazuya Mori, Kurume, both of Japan

[73] Assignee: Central Motor Wheel Co., Ltd., Anjo, Japan

[21] Appl. No.: 08/962,704

[22] Filed: Nov. 3, 1997

[51] Int. Cl.[7] .................................................. G06F 19/00
[52] U.S. Cl. ............................................. 700/108; 81/467
[58] Field of Search ...................... 81/467, 469; 700/95, 700/109

[56] References Cited

U.S. PATENT DOCUMENTS

| Re. 35,617 | 9/1997 | Krivec ...................................... 173/178 |
| 4,173,059 | 11/1979 | Hashimoto et al. ....................... 29/240 |
| 4,375,121 | 3/1983 | Sigmund ............................... 29/407.02 |
| 4,488,437 | 12/1984 | Pere .......................................... 73/761 |
| 4,922,436 | 5/1990 | Dohm et al. .............................. 81/470 |
| 4,987,669 | 1/1991 | Makimae et al. ..................... 29/407.03 |
| 4,991,473 | 2/1991 | Gotman .................................... 81/475 |
| 5,172,616 | 12/1992 | Negishi ..................................... 81/467 |
| 5,229,931 | 7/1993 | Takeshima et al. ......................... 700/4 |
| 5,236,053 | 8/1993 | Butsch .................................... 173/176 |
| 5,457,866 | 10/1995 | Noda .................................... 29/407.02 |
| 5,549,169 | 8/1996 | Matsumura et al. .................... 173/176 |
| 5,571,971 | 11/1996 | Chastel et al. ............................ 73/761 |
| 5,715,894 | 2/1998 | Maruyma et al. ...................... 173/180 |
| 5,774,364 | 6/1998 | Kamps .................................... 700/117 |

FOREIGN PATENT DOCUMENTS

| 40-24-577-A1 | 2/1992 | Germany . |
| 40-33-494-A1 | 4/1992 | Germany . |
| 44-04-419-A1 | 8/1995 | Germany . |
| 58-186538 | 10/1983 | Japan . |
| 3-294124 | 12/1991 | Japan . |

OTHER PUBLICATIONS

G.H. Junker: "Mechanische Grundlagen Moderner Steuerungsverfahren Fur Verschraubungsprozesse", vol. 129, No. 9, Sep. 1987, pp. 85–106.

*Primary Examiner*—William Grant
*Assistant Examiner*—Chad Rapp
*Attorney, Agent, or Firm*—Oliff & Berridge, PLC

[57] ABSTRACT

An elevator carrying a motor for rotating a socket wrench is lowered by a hydraulic cylinder while being guided by a linear guide, such that the socket wrench is rotated by the motor while the socket wrench is in engagement with the head of a bolt, with a compressive force being applied to the bolt based on a hydraulic pressure of the cylinder, and such that a wrenching torque and the compressive force acting on the bolt is detected by a detector. A coefficient of friction between thread surfaces of the bolt and an internal thread is evaluated based on the wrenching torque in an initial stage of wrenching operation in which the bolt head is spaced apart from a workpiece, while a coefficient of friction between the bolt head and the workpiece is evaluated based on the wrenching torque in an intermediate stage in which the thread surfaces of the bolt and the internal thread are spaced apart from each other immediately after contacting of the bolt head and the workpiece. The wrenching operation is terminated when actual wrenching torque reaches a target wrenching torque determined from the friction coefficients.

47 Claims, 23 Drawing Sheets

S12'

| DETERMINING INTERMEDIATE TORQUE VALUE T2 BASED ON RATE OF CHANGE OF DIFFERENCES OF SUCCESSIVELY DETECTED TORQUE VALUES, AND STORING IT IN INTERMEDIATE TORQUE MEMORY |
|---|

WRENCHING METHOD AND APPARATUS, WRENCHING ATTACHMENT, AND MEDIUM STORING WRENCHING TORQUE CONTROL PROGRAM

BACKGROUND OF THE INVENTION

1. Field of the Invention

The present invention relates to a method and an apparatus for tightening, fastening or clamping a workpiece between an externally threaded member and an internally threaded member, by rotating a rotary threaded member which is one of these two threaded members, while the rotary threaded member and a stationary threaded member which is the other threaded member are held in engagement with each other, so as to prevent rotation of the stationary threaded member. More particularly, the present invention is concerned with techniques for improving the accuracy of control of tightening or clamping force of the workpiece between the two threaded members.

2. Discussion of the Related Art

A workpiece or a plurality of workpieces may be tightened by and between externally and internally threaded members. For example, one workpiece having at least one through-hole may be fastened to an internally threaded member by screwing at least one externally threaded member each in the form of a bolt into the internally threaded member such that each bolt extends through the corresponding through-hole. Further, a plurality of workpieces may be tightened or clamped together by using at least one headed bolt and at least one nut as the externally and internally threaded members. A workpiece or a plurality of workpieces may be fastened to a member having at least one stud bolt fixed thereto, by screwing a nut on each stud bolt. In this instance, the member having the stud bolt or bolts is considered to be the externally threaded member, and the plurality of workpieces are fastened together in most cases. For tightening, fastening or clamping operation, either of the externally threaded member and the internally threaded member is rotated, and the other threaded member must be prevented from being rotated. In the following description, the threaded member to be rotated will be referred to as "rotary threaded member" while the other threaded member whose rotation is prevent will be referred to as "stationary threaded member".

For tightening or clamping the workpiece or workpieces by the externally and internally threaded members, the axial force acting on the externally threaded member must be accurately controlled as the tightening force. Since it is difficult to accurately detect this tightening force, however, the tightening force is conventionally controlled according to a "calibrated wrench tightening method", a "turn of nut tightening method" or a "torque gradient method" according to JIS B 1083 "Screw Tightening Method". In the "torque gradient method", the accuracy of control of the tightening force is not influenced by a friction coefficient between thread surfaces of the externally and internally threaded members (hereinafter referred to as "thread surface friction coefficient") and a friction coefficient between seat surfaces of the rotary threaded member and the workpiece (hereinafter referred to as "seat surface friction coefficient"). In the "calibrated wrench tightening method"and "turn of nut tightening method", the accuracy of control of the tightening force is influenced by those friction coefficients. Conventionally, the thread surface friction coefficient and the seat surface friction coefficient are measured before the tightening operation, so that the tightening force is controlled based on the measured friction coefficients. However, these two friction coefficients are influenced by the states of the thread surfaces and the seat surfaces, namely, by the surface roughness, hardness and lubricating state of the thread and seat surfaces, which are not usually constant. Accordingly, the tightening force tends to have a considerably large variation, leading to insufficient reliability of control of the tightening force.

Usually, at least one of a spring washer and a plane washer is interposed between the seat surface of the rotary threaded member and the seat surface of the workpiece. Accordingly, slipping usually takes place between the rotary threaded member and the washer or washers during rotation of the rotary threaded member. In the present application, the washer or washers is/are considered as part of the workpiece, and the seat surface of the washer(s) is considered as the seat surface of the workpiece. That is, the presence of the washer or washers is ignored in the present application. It is also noted that the spring washer may be rotated with the rotary threaded member. In this case, the seat surface of the spring washer contacting the seat surface of the workpiece should be considered as the seat surface of the rotary threaded member. Practically, however, it does not cause any problems in this case, to consider that the slipping takes place between the rotary member and the spring washer.

SUMMARY OF THE INVENTION

The present invention was developed in the light of the background art discussed above. It is therefore an object of the present invention to improve the reliability of control of the tightening force produced by an externally threaded member and an internally threaded member.

This object may be achieved according to any one of the following features or forms of the present invention in various categories, such as a method of tightening a workpiece between an externally threaded member and an internally threaded member, an apparatus suitable for practicing the method, an attachment for controlling the tightening force of the workpiece produced by the externally and internally threaded members, a recording medium storing a program for controlling the tightening force, a method of obtaining quantities relating to friction coefficients, and an apparatus for obtaining these quantities. As in the claims, these features of the invention described below are numbered, and some of these features are dependent from the other feature or features, where appropriate, so as to indicate possible combinations of the features.

(1) A method of tightening a workpiece between an externally threaded member and an internally threaded member, by rotating a rotary threaded member which is one of the externally and internally threaded members), while the externally and internally threaded members are held in engagement with each other and while a stationary threaded member which is the other of the externally and internally threaded members is prevented from being rotated, the method comprising: (a) detecting an actual initial value of a wrenching torque acting on the rotary threaded member while the rotary threaded member is rotated with an axial force acting thereon, in an initial stage of a wrenching operation in which a seat surface of the rotary threaded member is spaced apart from a seat surface of the workpiece; (b) determining a terminating condition for terminating the wrenching operation, on the basis of the detected actual initial value of the wrenching torque; and (c) terminating the wrenching operation when the terminating condition is satisfied.

The seat surfaces of the rotary threaded member and the workpiece are surfaces thereof which are brought into contact with each other during the wrenching operation, where no spring washer and/or plane washer is/are interposed between the rotary threaded member and the workpiece. Where at least one of such spring and plane washers is interposed between the rotary threaded member and the workpiece, the two surfaces between which slipping takes place during rotation of the rotary threaded member are considered as the "seat surfaces" of the rotary threaded member and the workpiece, unless otherwise specified. Usually, the slipping takes place between the rotary threaded member and the washer(s), as described above, and the contacting surfaces of the rotary threaded member and the washer(s) are considered as the "seat surfaces".

The actual initial wrenching torque value detected in the initial stage of the wrenching operation is influenced by the coefficient of friction between the externally and internally threaded members. Provided the two threaded members have the same nominal or effective diameter and the same lead angle or pitch, and provided the axial force acting on the rotary threaded member is kept constant, the wrenching torque required to obtain a desired tightening force to be applied to the workpiece increases with an increase in the friction coefficient of the thread surfaces (thread surface friction coefficient). Where the tightening force is controlled according to the calibrated wrench tightening method, an influence of the thread surface friction coefficient on the initial wrenching torque value can be reduced by increasing the desired or target wrenching torque value (wrenching torque at which the wrenching operation is terminated) with an increase in the initial wrenching torque value. Where the tightening force is controlled according to the turn of nut tightening method, the above-indicated influence of the thread surface friction coefficient can be reduced by increasing a start point torque value with an increase in the initial wrenching torque value. The start point torque value is a torque value at a "snug point", namely, at the point of time when a linear increase of the tightening force is initiated with the thread surfaces of the externally and internally threaded member in contact with each other. The angle of rotation of the rotary threaded member is measured from this point of time to terminate the wrenching operation. Experiments showed an increase in the accuracy of evaluation of the thread surface friction coefficient as the axial force applied to the rotary threaded member is increased. Where a spring washer is interposed between the seat surfaces of the rotary threaded member and the workpiece, in particular, it is desirable that the axial force is sufficient for close contact of the spring washer with the seat surfaces.

The terminating condition may be determined based on a quantity relating to the thread surface friction coefficient, which quantity may be determined based on the initial wrenching torque value. Alternatively, the terminating condition may be determined based on the thread surface friction coefficient as estimated from the initial wrenching torque value. To evaluate the thread surface friction coefficient, it is not necessary to estimate the thread surface friction coefficient per se.

(2) A method according to the above feature (1), wherein the axial force is a compressive force acting on the rotary threaded member in such a direction that would cause the seat surface of the rotary threaded member to move toward the seat surface of the workpiece.

Although the thread surface friction coefficient can be evaluated while an axial force (tensile force) acts on the rotary threaded member in such a direction that would cause the seat member of the rotary member to move away from the seat surface of the workpiece, it is desirable in most cases to detect the wrenching torque while a compressive force acts on the rotary threaded member in such a direction that would cause the seat member of the rotary member to move toward the seat surface of the workpiece. For instance, the compressive force may be applied to the rotary member by holding the working or wrenching portion (wrench member) of a wrenching apparatus in abutting contact with the rotary threaded member. In this case, a conventionally used socket wrench or hexagon wrench key may be used as the wrench member. On the other hand, the application of a tensile force to the rotary threaded member requires the use of a specially designed wrench member as explained in detail in the detailed description of preferred embodiments of this invention. Further, the construction of some wrench member requires the use of the rotary threaded member which is different in configuration from commonly available threaded members. It is also noted that the application of a compressive force to the rotary member permits the evaluation of a coefficient of friction between the seat surfaces of the rotary threaded member and the workpiece (seat surface friction coefficient), as well as the coefficient of friction between the rotary and stationary threaded members, as discussed below. On the other hand, the application of the tensile force does not permit the evaluation of the seat surface friction coefficient.

(3) A method according to the above feature (2), further comprising the step of detecting an actual intermediate value of the wrenching torque acting on the rotary threaded member in an intermediate stage of the wrenching operation in which the seat surface of the rotary threaded member is in contact with the seat surface of the workpiece while thread surfaces of the externally and internally threaded members are substantially spaced apart from each other, and wherein the step of determining a terminating condition comprises determining the terminating condition, on the basis of the actual intermediate value of the wrenching torque detected in the intermediate stage as well as the actual initial value of the wrenching torque detected in the initial stage.

Various types of axial force applying device may be used to apply the axial force to the rotary threaded member. Where the wrenching apparatus is portable and operated while it is hand-held by the operator, the weight of the apparatus may be utilized as the axial force. Alternatively, the axial force may be applied to the rotary threaded member by forcing the apparatus toward the rotary threaded member in the axial direction of the threaded members. The thread surface friction coefficient and the seat surface friction coefficient can be evaluated based on the axial force and the wrenching torque which are detected at the same time. That is, it is not necessary to hold the axial force constant throughout the wrenching operation.

Further, the axial force can be positively changed during a wrenching operation. For instance, the axial force is changed to different values, and the actual wrenching torque is detected for each of the axial force values. For each of the combinations of the axial force value and the wrenching torque value, the thread surface friction coefficient and the seat surface friction coefficient are evaluated, and the average values of these friction coefficients may be used to determine the terminating condition. In some cases, the friction coefficients vary with a change in the axial force. In such cases, a plurality of values of a quantity relating to the friction coefficient are obtained for respective different axial force values, and the quantity relating to the friction coefficient may be obtained for the desired axial force value, on the basis of the obtained plurality of values indicated above, according to a suitable calculating method such as extrapolation or interpolation. After the evaluation, the axial force may be eliminated or reduced, for facilitating the wrenching operation.

Where the friction coefficient changes with the axial force, the accuracy of control of the workpiece tightening or clamping force is improved as the axial force to be applied to the initial and intermediate stages approaches the desired or target value. However, an increase in the axial force tends to increase the size of the apparatus and deteriorate the wrenching efficiency. Therefore, the axial force is preferably determined by taking account of these two factors.

It is also noted that the rotating speed of the rotary threaded member need not be kept constant throughout the wrenching operation. In the initial and intermediate stages (in particular, in the intermediate stage whose time duration is relatively short), the rotary threaded member may be rotated at a relatively low speed to facilitate the detection of the wrenching torque and the evaluation of the friction coefficient. Conversely, the rotating speed and the wrenching torque in the final stage may be lowered and increased, respectively, by increasing the speed reduction ratio of a speed reducer in the final stage.

(4) A method according to any one of the above features (1) through (3), wherein the terminating condition is that the actual value of the wrenching torque has increased to a target value determined on the basis of at least the actual initial value detected in the initial stage.

This feature (4) corresponds to the control of the tightening force of the workpiece according to the calibrated wrench tightening method.

(5) A method according to any one of the above features (1), (2) and (3), wherein the terminating condition is that an actual value of an angle of rotation of the rotary threaded member from a point of time at which the actual value of the wrenching torque has reached a start torque value determined based on the actual initial value in the initial stage has increased to a target value determined on the basis of elastic coefficients of the externally threaded member and the workpiece and a target tightening force by which the workpiece is tightened between the externally and internally threaded members.

This feature (5) corresponds to the control of the tightening force of the workpiece according to the turn of nut tightening method. The start point torque value is not limited to the torque value at the "snug point" according to the turn of nut tightening method, but may be a torque value at the boundary point between the intermediate stage and a final stage in which the seat surfaces of the rotary threaded member and the workpiece are in contact with each other while the thread surfaces of the externally and internally threaded members are in contact with each other. Further, the start point torque value may be higher than the snug point torque value.

According to the turn of nut tightening method, the accuracy of control of the tightening force is largely influenced by the start point torque value, which is preferably the lower limit of the range in which the wrenching torque of the rotary threaded member is proportional to the angle of rotation of the rotary threaded member. However, it is comparatively difficult to precisely detect the lower limit of the above range. In view of this, the lower limit of the range of the tightening force in which the tightening force is proportional to the angle of rotation of the rotary threaded member is first determined. For instance, the tightening force value when the thread surfaces and the seat surfaces have entered stable mutual contacting states is first determined, and the start point torque value is determined on the basis of the determined tightening force value and the initial torque value in the initial stage (as the quantity relating to the thread surface friction coefficient), or on the basis of the determined tightening force value and the initial torque value in the initial stage and the intermediate torque value in the intermediate state (as the quantity relating to the seat surface friction coefficient). In this manner, the accuracy of control of the tightening force can be improved according to the above feature (5).

(6) A method according to any one of the above features (1) through (5), wherein the rotary threaded member is rotated by a wrench member to tighten the workpiece while a casing holding the wrench member such that the wrench member is rotated with the rotary threaded member is in engagement with the workpiece such that a reaction force of the axial force applied from the wrench member to the rotary threaded member is transmitted to the workpiece.

Where the axial force to be applied to the rotary threaded member is a tensile force, a reaction force of the tensile force can be transmitted to the stationary threaded member through the workpiece, by simply contacting the casing or an integral portion thereof with the surface of the workpiece. Where the axial force to be applied to the rotary member is a compressive force, on the other hand, it is required that the casing or an integral portion thereof be engaged with the workpiece so as to prevent the casing and the workpiece from moving away from each other. It is also required to prevent a floating movement of the workpiece with the casing in the direction toward the casing. This floating movement prevents the application of the sufficient compressive force to the rotary threaded member. Where the weight of the workpiece is larger than a compressive load which acts on the rotary threaded member, the floating movement of the workpiece with the sufficient compressive force being applied to the rotary threaded member can be prevented by positioning the casing above the workpiece and holding the casing in engagement with the workpiece so as to prevent the movement of the casing relative to the workpiece. Where the weight of the workpiece is smaller than the compressive load, the floating movement of the workpiece should be prevented by tentatively or provisionally tightening the workpiece or by using an exclusive jig or weight in engagement with the workpiece. While the above description refers to a wrenching operation where the workpiece is tightened in the vertical direction, the workpiece may be tightened in the horizontal direction where the workpiece is provisionally tightened or held by an exclusive jig as indicated above.

The term "wrench member" is interpreted to not only mean a wrenching tool such as a socket wrench and a hexagon wrench key which directly engages the rotary threaded member, but also encompass any other wrenching means including a polygon driver provided at the end of the output shaft of a wrenching apparatus such as an impact wrench device. Namely, the wrench member may be the output member of the wrenching apparatus. For instance, the output shaft is an output shaft provided at its free end with a hexagon socket wrench or a hexagon wrench key. Where the output shaft directly engages the hexagon head of the rotary threaded member or the hexagon hole in the head, the output shaft may be considered to be the wrench member. Where the output member is adapted to receive a wrenching tool such as a socket wrench, the output member does not directly engage the rotary threaded member, but only indirectly engages the rotary threaded member through the wrenching tool attached thereto. In this case, too, the output member may be broadly interpreted to be the wrench member. Further, the output shaft and the wrenching tool attached thereto may be considered to constitute a single member, that is, the wrench member.

(7) A method according to any one of the above features (2) through (5), wherein the workpiece is tightened by and between a plurality of sets of the externally and internally threaded members, the method comprising the steps of: provisionally tightening the rotary threaded member of each of at least one of the plurality of sets of the externally and internally threaded members; tightening at least one of the other sets of the externally and internally threaded members according to the method of any one of the above features (2) through (5), such that a casing which holds a wrench member such that the wrench member is rotated with the rotary threaded member is in engagement with the workpiece such that a reaction force of the axial force applied from the wrench member to the rotary threaded member is transmitted to the workpiece; loosening the provisionally tightened rotary threaded member of each of the above-indicated at least one of the plurality of sets of the externally and internally threaded members; and re-tightening the loosened rotary threaded member of each of the above-indicated at least one of the plurality of sets of the externally and internally threaded members, according to the method defined in claim 2.

According to the above feature (7), the workpiece can be tightened in either the vertical direction or the horizontal direction, without using an exclusive jig. Generally, the workpiece is tightened by using two or more sets of the externally and internally threaded members. Therefore, the present feature is available for most of various workpiece tightening operations. Where a plurality of internal threads are formed in one member, this member is considered to have a plurality of externally threaded members.

(8) An apparatus for tightening a workpiece between an externally threaded member and an internally threaded member, by rotating a rotary threaded member which is one of the externally and internally threaded members, while the externally and internally threaded members are held in engagement with each other and while a stationary threaded member which is the other of the externally and internally threaded members is prevented from being rotated, the apparatus comprising: (a) a rotary driving device for rotating the rotary threaded member; (b) an axial force applying device for applying an axial force to the rotary threaded member, at at least one point of time in an initial stage of a wrenching operation in which the rotary threaded member is rotated by the rotary driving device while a seat surface of the rotary threaded member is spaced apart from a seat surface of the workpiece; (c) a torque detecting device for detecting an actual value of a wrenching torque acting on the rotary threaded member while the axial force is applied to the rotary threaded member; (d) terminating condition determining means for determining a terminating condition for terminating the wrenching operation, on the basis of an actual initial value of the wrenching torque detected by the torque detecting device in the initial stage; and (e) termination commanding means for generating a terminating command for turning off the rotary driving device when the terminating condition determined by the terminating condition determining means is satisfied.

The wrenching apparatus constructed according to the above feature (8) is capable of practicing the method according to the above feature (1). The axial force applying device may be adapted to hold the axial force applied to the rotary threaded member throughout the initial stage, or apply the axial force at one point of time in the initial stage or intermittently apply the axial force in the initial stage. Although the torque detecting device may be adapted to detect the wrenching torque at one point of time, the accuracy of detection of the wrenching torque can be improved by detecting two or more values of the wrenching torque. The apparatus may further comprise automatically stopping means operated in response to the terminating command generated by the termination commanding means, for automatically turning off the rotary driving device. In this case, the wrenching operation is automatically terminated when the actual wrenching torque has reached the desired value. While this arrangement is ideal, the automatically stopping means not essential. Namely, a suitable indicator such as a buzzer which is activated in response to the terminating command may be provided so that the operator manually turns off the rotary drive device in response to the activation of the indicator.

(9) An apparatus according to the above feature (8), wherein the axial force applying device applies as the axial force a compressive force to the rotary threaded member in such a direction that would cause the seat surface of the rotary threaded member to move toward the seat surface of the workpiece.

(10) An apparatus according to the above feature (9), wherein the axial force applying device applies an axial force to the rotary threaded member, also at at least one point of time in an intermediate stage of the wrenching operation in which the seat surfaces of the rotary threaded member and the workpiece are in contact with each other while thread surfaces of the externally and internally threaded members are substantially spaced apart from each other, and the torque detecting device detects an actual intermediate value of the wrenching torque at the above-indicated at least one point of time in the intermediate stage, the terminating condition determining means determining the terminating condition on the basis of the actual intermediate value as well as the actual initial value.

(11) An apparatus according to any one of the above features (8)–(10), wherein the terminating condition determining means comprises means for determining whether the actual value of the wrenching torque has increased to a target value determined on the basis of the actual initial value of the wrenching torque detected in the initial stage.

(12) An apparatus according to any one of the above features (8)–(10), wherein the terminating condition determining means comprises means for determining whether an actual value of an angle of rotation of the rotary threaded member from a point of time at which the actual value of the wrenching torque has reached a start torque value determined based on the actual initial value in the initial stage has increased to a target value determined on the basis of elastic coefficients of the externally threaded member and the workpiece and a target tightening force by which the workpiece is tightened between the externally and internally threaded members.

(13) An apparatus according to any one of the above features (10)–(12), further comprising intermediate stage detecting means for detecting at least one point of time in the intermediate stage.

(14) An apparatus according to the above feature (13), wherein the intermediate stage detecting means comprises means for detecting the above-indicated at least one point of time in the intermediate stage, on the basis of the actual value of the wrenching torque detected by the torque detecting device.

Since the initial and intermediate values of the wrenching torque are usually different from each other, the intermediate stage can be detected based on the detected actual wrenching torque. For instance, the initiation of the intermediate stage can be detected by detecting an abrupt change in the actual wrenching torque, which occurs at a boundary between the initial and intermediate stage. This arrangement is a feature (15) described below. However, the detection of the wrenching torque to detect the intermediate stage is not essential. Namely, the initiation of the intermediate stage can be detected by detecting an abrupt change in a reaction force acting on the wrench member, which abrupt change takes place when the seat member of the rotary threaded member is brought into abutting contact with the seat surface of the workpiece, as described below in detail with respect to a preferred embodiment of the invention. The amount of change in the reaction force is particularly large where the rotating speed of the rotary threaded member is relatively high, or where a spring washer is not interposed between the seat surfaces.

(15) An apparatus according to the above feature (14), wherein the intermediate stage detecting means comprises means for detecting an abrupt change in the actual value of the wrenching torque which takes place upon transition from the initial stage to the intermediate stage, and thereby detecting a point of initiation of the intermediate stage upon detection of the abrupt change.

(16) An apparatus according to the above feature (14) or (15), wherein the intermediate stage detecting means comprises: a torque memory for storing the actual values of the wrenching torque successively detected by the torque detecting means; and intermediate stage termination determining means for determining a point of termination of the intermediate stage, on the basis of a group of the actual values of the wrenching torque which have been stored in the torque memory before a current value of the wrenching torque has reached a predetermined value, the intermediate stage termination determining means determining the point of termination after the current value has reached the predetermined value.

The rate of change of the wrenching torque upon transition from the intermediate stage to final stage of the wrenching operation is lower than that upon transition from the initial stage to the intermediate stage. In this sense, it is not impossible to detect the transition from the intermediate stage to the final stage, in a real-time manner. However, the detection of this transition with sufficiently high accuracy is rather difficult. On the other hand, the transition to the final stage or the point of termination of the intermediate stage can be detected comparatively easily, on the basis of a group of actual wrenching torque values which have been detected and stored in a suitable torque memory at a predetermined time interval. However, since the target or desired wrenching torque value to establish the target or desired tightening or clamping force of the workpiece must be determined before the actual wrenching torque value has reached that target wrenching torque value, where the wrenching torque is controlled according to the calibrated wrench tightening method, Where the wrenching torque is controlled according to the turn of the nut tightening method, too, the target or desired angle of rotation of the rotary threaded member to establish the target tightening force must be determined before the actual wrenching torque value has reached the target wrenching torque value. Accordingly, it is preferred to detect the point of termination of the intermediate stage at a point of time as early as possible. In this respect, it is desirable that the predetermined value of the actual wrenching torque value indicated above be a minimum value that permits the detection of the transition from the intermediate stage to the final stage. The intermediate stage termination determining means may be adapted to check the rate of change of the detected and stored wrenching torque values with a change of the rotation angle of the rotary threaded member, in the direction opposite to the direction in which those torque values have been detected and stored in the torque memory. In this case, the intermediate stage termination determining means may be adapted to determine, as the point of termination of the intermediate stage, a point of time at which the rate of change becomes smaller than a predetermined value (for example, zero), for the first time. Alternatively, the determining means may be adapted to determine, as the point of termination of the intermediate stage, a point of time at which a minimal value of the detected torque values is detected. Further alternatively, the determining means may be adapted to determine, as the point of termination of the intermediate stage, a point of time at which two straight lines generally defined by the stored torque values intersect each other. One of these two straight lines is considered to be defined by a first set of the torque values detected in the intermediate stage, while the other straight line is considered to be defined by a second set of the torque values detected in the final stage.

(17) An apparatus according any one of the above features (8) through (16), wherein the terminating condition determining means comprises friction coefficient estimating means for estimating at least one of a coefficient of friction between thread surfaces of the externally and internally threaded members and a coefficient of friction between the seat surfaces of the rotary threaded member and the workpiece, on the basis of the actual value of the wrenching torque detected by the torque detecting device and the axial force applied to the rotary threaded member by the axial force applying leans, and wherein the terminating condition determining means determines the terminating condition on the basis of the above-indicated at least one of the coefficients of friction estimated by the friction coefficient estimating means.

(18) An apparatus according to the above feature (17), further comprising an axial force detecting device for detecting the axial force applied to the rotary threaded member by the axial force applying device, and the friction coefficient estimating means estimates the above-indicated at least one of the coefficients of friction, on the basis of the axial force detected by the axial force detecting device and the actual value of the wrenching torque detected by the torque detecting device.

If the axial force to be applied to the rotary threaded member by the axial force applying device is kept constant at a predetermined value, the axial force detecting device is not necessary. However, the provision of the axial force detecting device makes it possible to estimate at least one of the friction coefficients indicated above, on the basis of the axial force and the wrenching torque which are detected at the same time. In this case, it is not necessary to hold the axial force constant, advantageously leading to an increase in the freedom in the wrenching operation. Even where the axial force to be applied by the axial force applying device is held constant, the use of the axial force detecting device permits improved accuracy of estimation of the friction coefficients.

(19) An apparatus according to any one of the above features (8) through (18), wherein the rotary driving device comprises a wrench member engageable with with the rotary threaded member for rotation therewith, and a rotary drive source for rotating the wrench member.

(20) An apparatus according to the above feature, wherein the axial force applying device comprises: a reaction force receiving member which is immovable relative to the stationary threaded member in an axial direction of the externally and internally threaded members, at least when the wrenching operation is performed with the rotary threaded member being rotated; and an axial driving device disposed between the reaction force receiving member and the wrench member, for moving the reaction force receiving member and the wrench member in the axial direction.

A typical form of the reaction force receiving member is described below as a feature (21). However, the reaction force receiving member need not be engageable with one of the stationary threaded member and the workpiece. Where the workpiece is mounted on a support base disposed on a floor, for example, the reaction force receiving member may be fixed to a support frame different from the support base, or to a ceiling, or may be supported by an elevator device such as a hydraulic cylinder.

(21) An apparatus according to the above feature (20) wherein the reaction force receiving member is engageable with one of the stationary threaded member and the workpiece, such that a reaction force of the axial force applied to the rotary threaded member through the wrench member is transmitted to the one of the stationary threaded member and the workpiece.

(22) An apparatus according to the above feature (21), wherein the reaction force receiving member comprises a mechanical engaging portion which is mechanically engageable with one of the stationary threaded member and the workpiece.

The mechanical engaging portion may be a collet chuck, or a portion of a caliper, which portion is engageable with the stationary threaded member, as described below in detail with respect to preferred embodiments of the invention.

(23) An apparatus according to the above feature, wherein the reaction force receiving member comprises a vacuum engaging portion which is fixed under vacuum to one of the stationary threaded member and the workpiece.

According this feature (23) and the following feature (24), the reaction force receiving member can be fixed to even a flat surface of the stationary threaded member or workpiece.

(24) An apparatus according to the above feature, wherein the reaction force receiving member comprises a magnetic engaging portion which is fixed with a magnetic force to one of the stationary threaded member and the workpiece.

The magnetic engaging portion may include a permanent magnet, or preferably an electromagnet, which permits easy fixing and removal of the reaction force receiving member to and from the stationary threaded member or workpiece.

(25) An apparatus according to the above feature (19), wherein the axial force applying device comprises: a load balancer operable to suspend a mass consisting of the wrench member and all members which are moved with the wrench member, with a suspending force substantially equal to a weight of the mass; and a balancer releasing device for releasing an operation of the load balancer.

In the wrenching apparatus according to the above feature (25), the operating force of the load balancer is counterbalanced with the weight of the mass consisting of of the wrench member and the members which are moved with the wrench member. This arrangement permits the operator of the apparatus to easily position the apparatus so that the wrench member engages the rotary threaded member. Then, the operation of the load balancer is released by activating the balancer releasing device, so that the weight of the mass acts on the rotary threaded member as a compressive force. The compressive force acting on the rotary threaded member increases with an increase of the weight of the mass. Since the weight of the mass is received by the load balancer, the manipulation of the apparatus by the operator is not deteriorated even when the weight of the mass is relatively large.

(26) n apparatus according to the above feature (19), wherein the axial force applying device comprises: a length changing device disposed between at least a portion of the apparatus and the wrench member, and having a length which is changeable; and control device for changing the length of the length changing device at least once in at least one of the initial and intermediate stages of the wrenching operation.

When the length of the length changeable device is changed, the wrench member and at least a portion of the apparatus (referred to as "inertia mass portion") are moved away from each other. Since the wrench member engages the rotary threaded member which is in engagement with the stationary threaded member, the wrench member is not movable, so that the inertia mass portion is moved away from the wrench member. As a result, an inertial force which is a product of an acceleration of this movement and a mass of the inertia mass portion acts on the rotary threaded member as the axial force through the wrench member. When the length of the length changeable device is increased and decreased, a compressive force and a tensile force act on the rotary threaded member, respectively. The inertial force can be easily made larger than the weight of the mass consisting of the wrench member and the other members moved with the wrench member, a relatively large axial force can be applied to the rotary threaded member, without having to significantly increase the weight of the apparatus. The axial force can be increased by increasing at least one of the mass and the acceleration of the inertia mass portion. On the other hand, it is desirable that the inertial force be present for a relatively long time while the acceleration be maintained at a comparatively high value for a relatively long time. However, since this is not so easy, it is desirable to maximize the mass of the inertia mass portion, and to dispose the length changeable device as close as possible to the wrench member, for maximizing the number of the members of the apparatus which function as the inertia mass portion.

(27) An apparatus according to any one of the above features (19) through (26), wherein the rotary driving source comprises an electric motor.

(28) An apparatus according to the above feature (27), wherein the torque detecting device detects the actual value of the wrenching torque on the basis of an electric current of the electric motor.

(29) An apparatus according to any one of the above features (19) through (26), wherein the rotary driving source comprises an air motor.

(30) An apparatus according to any one of the above features (19) through (29), wherein the rotary driving device comprises an impact torque applying device for applying an impact torque to the wrench member while transmitting a rotary motion of the rotary driving source to the rotary threaded member.

Generally, the accuracy of evaluation of the thread surface friction coefficient and the seat surface friction coefficient is relatively high when the wrench member is rotated at a relatively high speed. Even when the rotating speed of the wrench member varies with an impact torque being applied to the wrench member, there exists a certain relationship between the friction coefficients and the wrenching torque, and therefore the friction coefficients can be evaluated on the basis of the wrenching torque. The tightening force for the workpiece can be more easily increased when the impact torque is applied to the wrench member than when the wrenching torque is held constant. For improving the accuracy of evaluation of the friction coefficients in the initial and intermediate stages, however, it is preferable not to apply the impact wrenching torque to the wrench member. Since the application of the impact torque is intended to facilitate eventual establishment of the desired tightening force, it is sufficient to apply the impact torque in a latter half of the final stage of the wrenching operation. namely, it is desired not to apply the impact torque in the initial and intermediate stages, and apply it only in the final stage.

(31) An apparatus according to any one of the above features (8) through (30), further comprising abnormality detecting means for detecting an abnormality relating to engagement of the externally and internally threaded members, on the basis of the wrenching torque detected by the torque detecting device in an initial portion of the initial stage.

When there exists a certain abnormality in the thread engagement of the externally and internally threaded members such as a presence of a foreign matter between the thread surfaces of the threaded members or inadequate contact of the thread surfaces, the initial wrenching torque value in the initial stage becomes larger than when there does not exist such abnormality in the thread engagement. For instance, the abnormality detecting means may include permissible range determining means for determining a permissible range of the wrenching torque within which there does not exist an abnormality in the thread engagement, and abnormality determining means for determining the existence of the abnormality if the wrenching torque detected in the initial stage is outside the determined permissible range. This range may be determined on the basis of information such as the nominal diameter and pitch of the threads. The provision of this abnormality detecting means permits early finding of the thread engagement abnormality. Means for turning off the apparatus in response to the detection of the abnormality by the abnormality detecting means may be provided, for effectively avoiding undesirable continuation of the wrenching operation in the presence of the thread engagement abnormality.

(32) An attachment attachable to a wrenching apparatus for tightening a workpiece between an externally threaded member and an internally threaded member, the wrenching apparatus including a casing, a wrench member rotatably supported by the casing, and a rotary driving device for rotating the wrench member while it is in engagement with a rotary threaded member which is one of the externally and internally threaded members, so that the rotary threaded member is rotated by the wrench member while a stationary threaded member which is the other of the externally and internally threaded members is prevented from being rotated, the attachment comprising: (a) an auxiliary casing attached to the casing of the wrenching apparatus; (b) a rotation transmitting member rotatably supported by the auxiliary casing and including a connecting portion at a rear end thereof and a wrenching portion at a front end thereof, the connecting portion engaging the wrench member for rotation therewith, and the wrenching portion being engageable with the rotary threaded member for rotating the rotary threaded member; (c) a torque detecting device for detecting a torsional torque of the rotation transmitting member; and (d) a control device connected to the torque detecting device and including terminating condition determining means for determining a terminating condition on the basis of an actual initial value of a wrenching torque which is the torsional torque detected by the torque detecting device in an initial stage of a wrenching operation in which at least a seat surface of the rotary threaded member is spaced apart from a seat surface of the workpiece, and (ii) termination commanding means for generating a terminating command for turning off the rotary driving device when the terminating condition determined by the terminating condition determining means is satisfied.

The wrenching apparatus according to the above feature (8) of the present invention may be obtained by attaching the present attachment according to the feature (32) to a conventional or ordinary wrenching apparatus.

(33) A recording medium readable by a computer and storing a wrenching torque control program executed by the computer in a wrenching operation in which a workpiece is tightened between an externally threaded member and an internally threaded member, by rotating a rotary threaded member which is one of the externally and internally threaded members, while the externally and internally threaded members are in engagement with each other and while a stationary threaded member which is the other of the externally and internally threaded members is prevented from being rotated, the wrenching torque control program comprising: (a) a step of detecting an actual initial value of a wrenching torque acting on the rotary while the rotary threaded member is rotated, in an initial stage of a wrenching operation in which a seat surface of the rotary threaded member is spaced apart from a seat surface of the workpiece; (b) a step of determining a terminating condition for terminating the wrenching operation, on the basis of the detected actual initial value of the wrenching torque; and (c) a step of terminating the wrenching operation when the terminating condition is satisfied.

(34) A method of obtaining a quantity relating to a coefficient of friction between seat surfaces of an externally threaded member and an internally threaded member, in a wrenching operation in which a workpiece is tightened between the externally and internally threaded members, by rotating a rotary threaded member which is one of the externally and internally threaded members, while the externally and internally threaded members are in engagement with each other and while a stationary threaded member which is the other of the externally and internally threaded members is prevented from being rotated, the method comprising detecting an actual value of a wrenching torque acting on the rotary threaded member while the rotary threaded member is rotated with an axial force acting thereof, in an initial stage of the wrenching operation in which a seat surface of the rotary threaded member is spaced part from a seat surface of the workpiece.

In one application of this method of obtaining the friction coefficient, the quantity relating to the friction coefficient is first obtained according to the present method for each of a selected at least one of a plurality of rotary threaded members, before the wrenching operation to tighten all of these rotary threaded member is initiated. Based on the obtained friction coefficient related quantity, the wrenching torque for wrenching the plurality of rotary threaded members is controlled according to the conventional calibrated wrench tightening method.

(35) An apparatus for obtaining a quantity relating to a coefficient of friction between seat surfaces of an externally threaded member and an internally threaded member, in a wrenching operation in which a workpiece is tightened between the externally and internally threaded members, by rotating a rotary threaded member which is one of the externally and internally threaded members, while the externally and internally threaded members are in engagement with each other and while a stationary threaded member which is the other of the externally and internally threaded members is prevented from being rotated, the apparatus comprising: (a) a rotary driving device for rotating the rotary threaded member; (b) an axial force applying device for applying an axial force to the rotary threaded member, at at least one point of time in an initial stage of the wrenching operation in which the rotary threaded member is rotated by the rotary driving device while a seat surface of the rotary threaded member is spaced apart from a seat surface of the workpiece; and (c) a torque detecting device for detecting an actual value of a wrenching torque acting on the rotary threaded member while the axial force is applied to the rotary threaded member.

(36) A method of tightening a workpiece between an externally threaded member and an internally threaded member, by rotating a rotary threaded member which is one of the externally and internally threaded members, while the externally and internally threaded members are held in engagement with each other and while a stationary threaded member which is the other of the externally and internally threaded members is prevented from being rotated, the method comprising: (a) measuring an actual value of a wrenching torque acting on the rotary threaded member while the rotary threaded member is rotated, with an axial force larger than a predetermined value being applied thereto in a direction for forcing a seat surface thereof against a seat surface of the workpiece, in an intermediate stage of the wrenching operation in which the seat surfaces of the rotary threaded member and the workpiece are in contact with each other and while thread surfaces of the externally and internally threaded members are substantially spaced apart from each other, and determining a snug point torque value of the rotary threaded member on the basis of the measured actual value of the wrenching torque; and (b) rotating the rotary threaded member while measuring an angle of rotation of the rotary threaded member after the snug point torque value has been reached, and stopping rotation of the rotary threaded member when the measured angle of rotation has reached a target value necessary to establish a desired tightening force for tightening the workpiece.

According to the above feature (36), the snug point value of the wrenching torque can be determined with high accuracy on the basis of the wrenching torque measured in the intermediate stage, while the rotary threaded member is rotated with a an axial force being applied thereto such that the axial force is large enough to hold the seat surfaces of the rotary threaded member and the workpiece in stable contact with each other. The present method permits improved accuracy of control of the tightening force according to the turn of nut tightening method. This method according to the feature (36) is based on a technical concept which is basically different from the above-described arrangements in which the tightening force is controlled by evaluating the thread surface friction coefficient and/or the seat surface friction coefficient. Accordingly, the axial force to be applied to the rotary threaded member is determined to be sufficient for holding the seat surfaces of the rotary threaded member and the workpiece in a stably contacting state. Where a spring washer is interposed between the seat surfaces of the rotary threaded member and the workpiece, the axial force is determined to be sufficient for holding the spring washer in close contact with the seat surfaces of the rotary threaded member and the workpiece. Where a plane washer is interposed between the rotary threaded member and the workpiece, the axial force is determined to be sufficient for permitting the seat surfaces of the plane washer to contact with the seat surfaces of the rotary threaded member and the workpiece in substantially the same state as the state after eventual tightening of the workpiece, such that minute projections on the seat surfaces, and foreign matters which may be caught between the seat surfaces are completely crushed into particles.

(37) An apparatus for tightening a workpiece between an externally threaded member and an internally threaded member, by rotating a rotary threaded member which is one of the externally and internally threaded members, while the externally and internally threaded members are held in engagement with each other and while a stationary threaded member which is the other of the externally and internally threaded members is prevented from being rotated, the apparatus comprising: (a) an axial force applying device for applying an axial force to the rotary threaded member in a direction for forcing a seat surface thereof against a seat surface of the workpiece, in an intermediate stage of the wrenching operation in which the seat surfaces of the rotary threaded member and the workpiece are in contact with each other and while thread surfaces of the externally and internally threaded members are substantially spaced apart from each other; (b) a torque detecting device for detecting an actual value of a wrenching torque acting on the rotary threaded member in the intermediate stage; (c) snug point torque determining means for determining a snug point torque value of the rotary threaded member on the basis of the actual value of the wrenching torque detected by the torque detecting device; (d) a rotation angle detecting device for detecting an angle of rotation of the rotary threaded member after the snug point torque value has been reached; and (e) commanding means for generating a stopping command for stopping rotation of the rotary threaded member when the measured angle of rotation has reached a target value necessary to establish a desired tightening force for tightening the workpiece.

The apparatus according to this feature (37) is suitable for practicing the method according to the feature (36).

BRIEF DESCRIPTION OF THE DRAWINGS

The above and optional objects, features, advantages and technical and industrial significance will be better understood by reading the following detailed description of presently preferred embodiments of the invention, when considered in connection with the accompanying drawings in which.

DETAILED DESCRIPTION OF THE PREFERRED EMBODIMENTS

Figure 1:
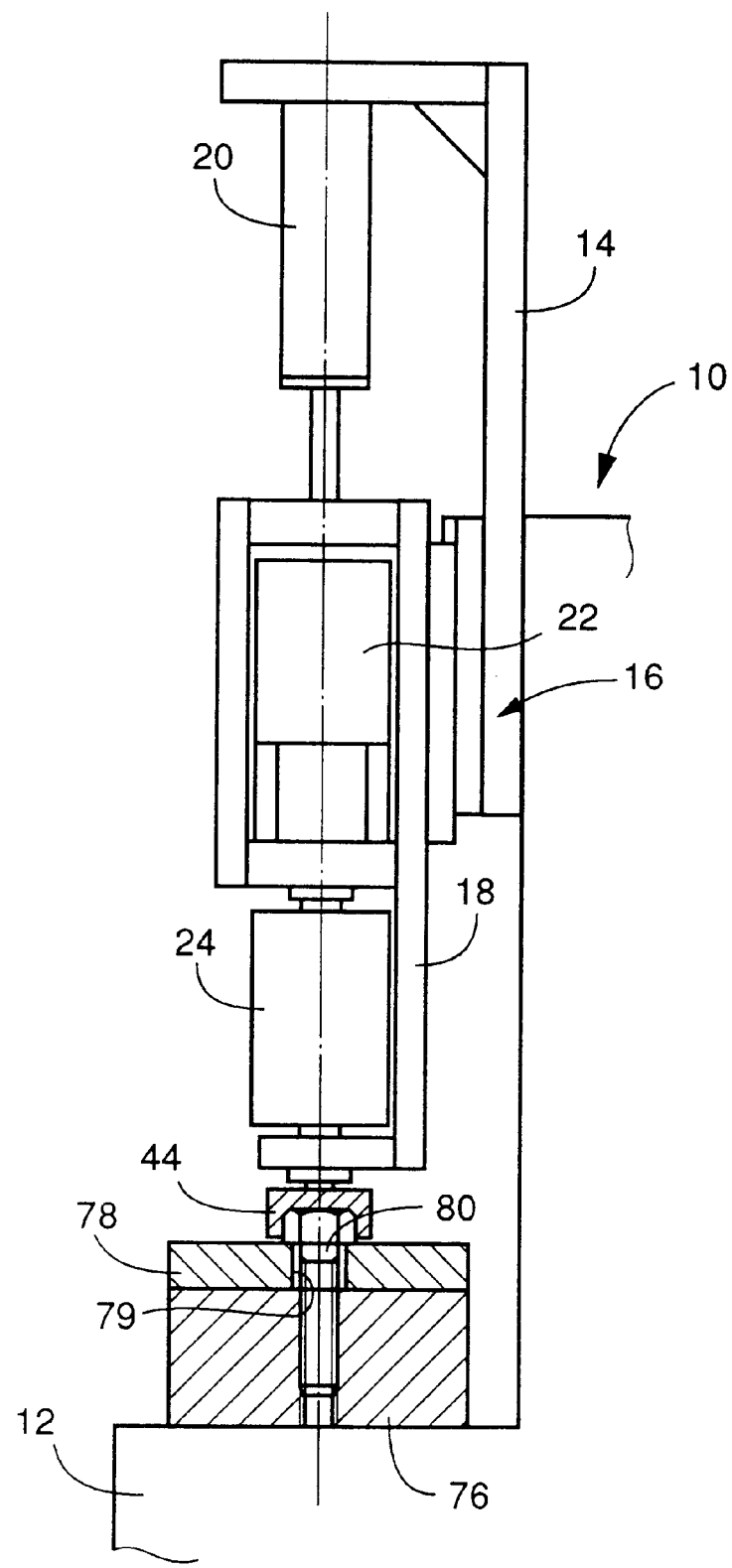
FIG. 1 is a front elevational view of a wrenching apparatus constructed according to a first embodiment of this invention.
Figure 2:
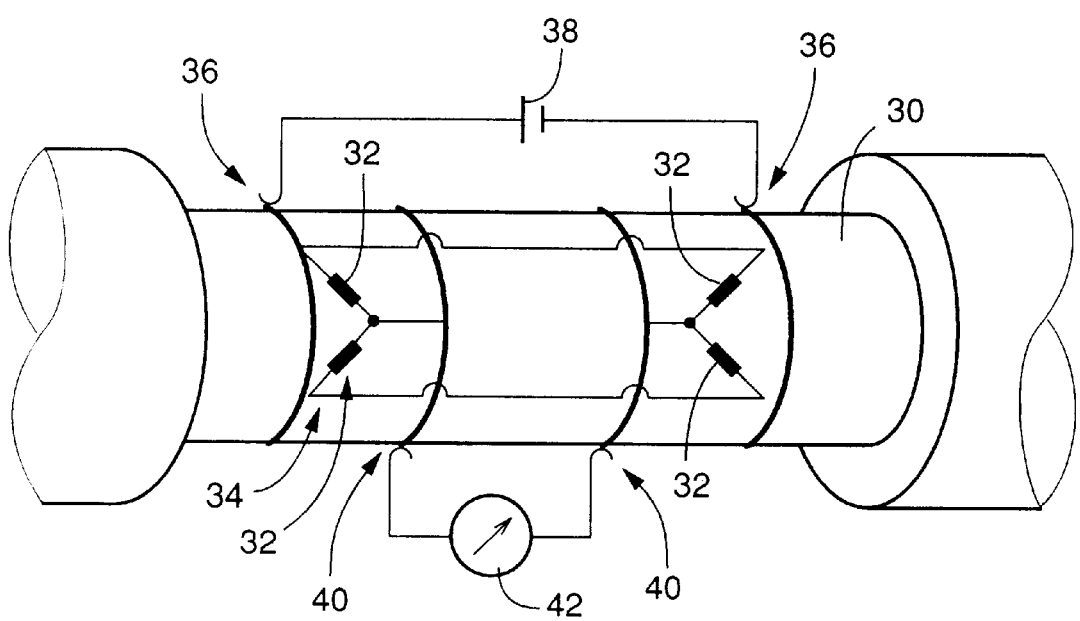
FIG. 2 is a view schematically showing a torque detecting portion provided in the wrenching apparatus of FIG. 1.
Figure 3:
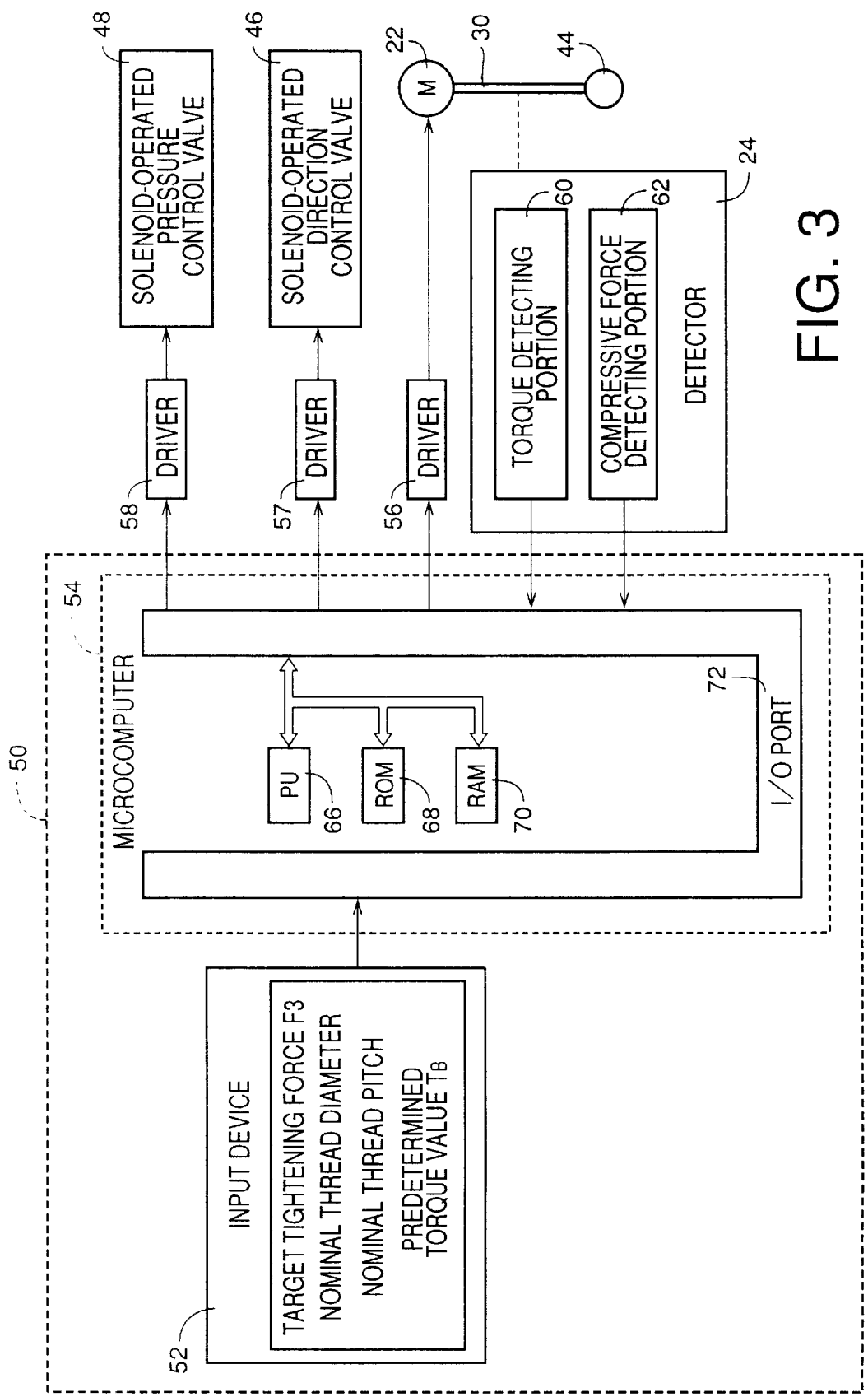
FIG. 3 is a block diagram showing a control system for controlling the wrenching apparatus of FIG. 1.

Referring first to FIG. 1, reference numeral 10 denotes a body frame of a screwing or wrenching apparatus. The main frame 10 includes a support base 12 to which is fixed a bracket 14 having a linear guide 16. An elevator 18 is attached to the bracket 14 through the linear guide 16, so that the elevator 18 is movable up and down by a hydraulic cylinder 20. To the elevator 18, there are connected an electric motor (hereinafter referred to simply as "motor") 22 equipped with a speed reducer, and a detector 24. As described below, the detector 24 includes a torque detecting portion 60 and a compressive force detecting portion 62, as indicated in FIG. 3. As shown in FIG. 2, the torque detecting portion 60 includes a detecting shaft 30 connected to the output shaft of the motor 22. On the circumferential surface of the detecting shaft 30, there are fixedly provided two pairs of strain gages 32 such that the two strain gages 32 of each pair are inclined at +45° and −45°, respectively, with respect to the axis of the detecting shaft 30. These two pairs of strain gages 32 cooperate to constitute a bridge circuit 34. This bridge circuit 34 is connected to a direct current (DC) power source 38 through two pairs of slip rings 36, and to a voltage detecting circuit 42 through two pairs of slip rings 40. When a torsional or twisting torque acts on the detecting shaft 30, a voltage proportional to the torsional torque is detected by the voltage detecting circuit 42.

The compressive force detecting portion 62 is adapted to detect a compressive force acting on an externally threaded member in the form of a bolt 80 which will be described. While the compressive force detecting portion 62 is not shown, this portion 62 is identical with the torque detecting portion 60, except that four strain gages are fixed on the detecting shaft 30 in parallel with the axis of the detecting shaft 30. It is noted that the compressive force may be obtained by calculation based on a hydraulic pressure in the hydraulic cylinder 20, which may be detected by a suitable pressure detector.

To the end portion of the detecting shaft 30 remote from the motor 22, there is fixed a wrench in the form of a socket wrench 44. The operation and the operating force of the hydraulic cylinder 20 are electrically controlled by an operation control valve device such as a solenoid-operated directional control valve 46, and an operation force control valve device such as a solenoid-operated pressure control valve 48, as indicated in block diagram of FIG. 3.

The above-indicated solenoid-operated directional control valve 46, solenoid-operated pressure control valve 48, motor 22 and detector 24 are connected to a control device 50, as shown in FIG. 3. The control device 50 includes an input device 52, and a processing device in the form of a microcomputer 54. The microcomputer 54 is adapted to control the motor 22 and the solenoid-operated directional control valve 46 and pressure control valve 48, through respective drivers 56, 57 and 58. The microcomputer 54 is also adapted to receive the outputs of the torque detecting portion 60 and the compressive force detecting portion 62. To this end, the microcomputer 54 incorporates a processing unit (PU) 66, a read-only memory (ROM) 68, a random-access memory (RAM) 70, and an input/output (I/O) port 72. The ROM 68 stores various control programs such as a program for executing a wrenching torque control routine illustrated in the flow chart of FIG. 4. The PU 66 operates to control the valves 46, 48 and motor 22 according to the control programs, while utilizing a temporary data storage function of the RAM 70.

The present wrenching apparatus is suitable for clamping together a first member 76 and a second member 78 which can be mounted on the base 12, as shown in FIG. 1. The first member 76 is a stationary threaded member, while the second member 78 is a workpiece to be tightened to the stationary threaded member 76. These two members 76, 78 are clamped together by a rotary threaded member in the form of a bolt 80 having an externally threaded portion 82 and a head 86, as shown in FIG. 5. Before initiating a wrenching operation, necessary data such as a target tightening or clamping force F3 and nominal thread diameter d and pitch of the bolt 80 and a predetermined torque value for the bolt 80 are entered through the input device 52 by the operator or received from a host computer, and are stored in the RAM 70. Then, the first and second members 76, 78 are mounted on the base 12, and the externally threaded portion 82 of the bolt 80 is brought into initial engagement with a tapped hole or internally threaded portion 84 of the first member 76, extending through a through-hole or bolt hole 79 formed through the second member 78. Thus, the preparation for initiating the wrenching operation is completed. The wrenching operation of the wrenching apparatus is performed automatically according to the wrenching torque control routine of FIG. 4, by turning on a start pushbutton provided on the input device 52.

Figure 4:
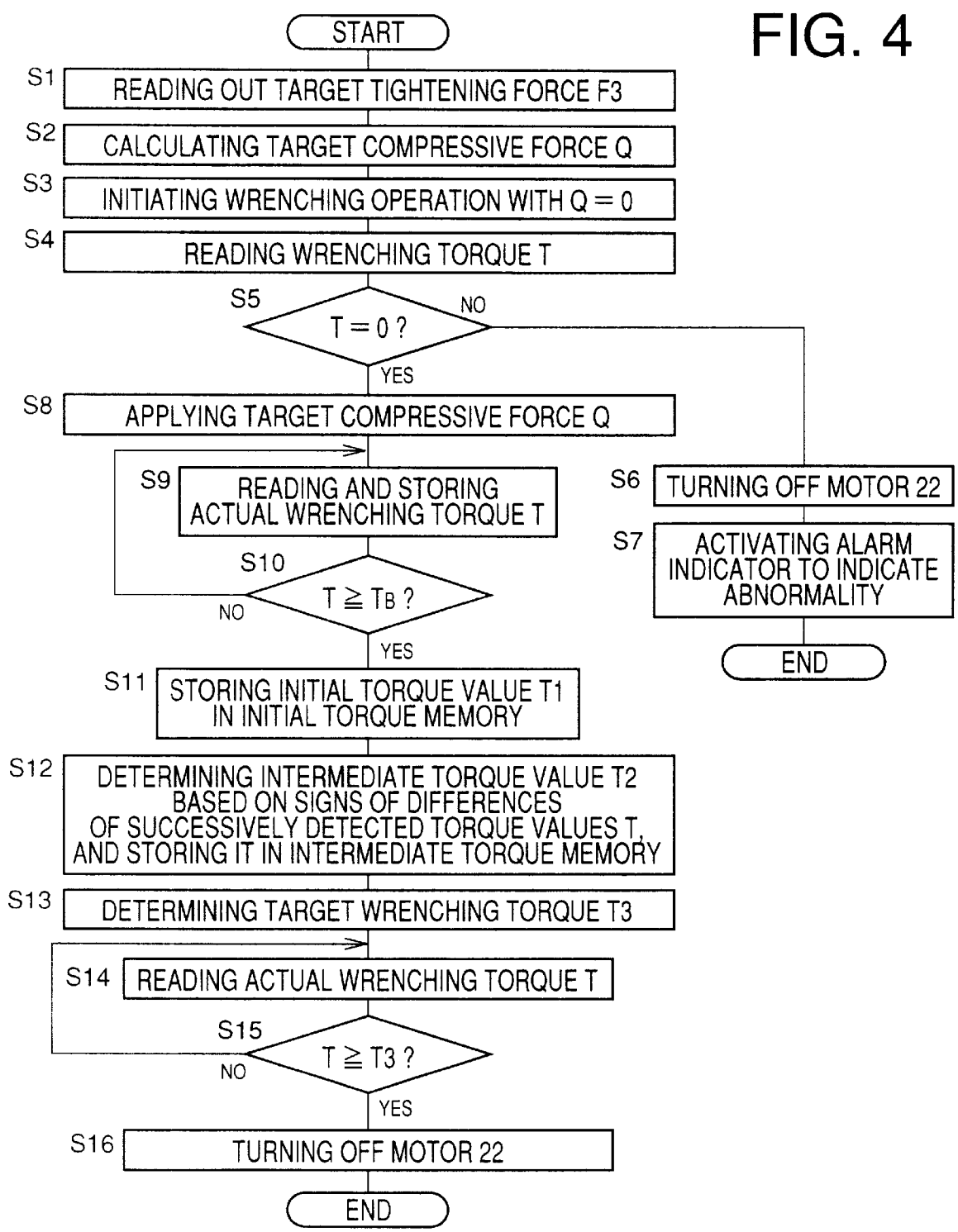
FIG. 4 is a flow chart illustrating a wrenching torque control routine executed by a control device of the control system of FIG. 3.
Figure 5:
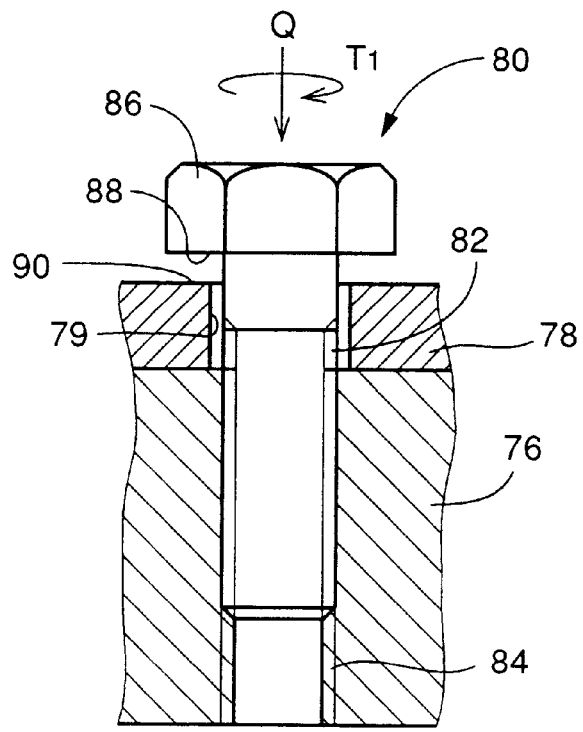
FIG. 5 is a view showing an initial stage of a wrenching operation performed by the wrenching apparatus of FIG. 1.

The wrenching torque control routine illustrated in the flow chart of FIG. 4 is initiated with step S1 to read the target tightening force F3 from the RAM 70. Step S1 is followed by step S2 to calculate a target compressive force Q to be applied to the bolt 80. From the standpoint of the accuracy of evaluation of the friction coefficient, it is desirable that the compressive force Q be equal to the target tightening force F3. However, an increase in the compressive force leads to an increase in the size of the wrenching apparatus and deterioration of the operating efficiency of the apparatus. In this respect, the compressive force Q is generally made smaller than the target tightening force F3. Further, it is generally desirable to increase the compressive force with an increase in the nominal thread diameter d of the bolt 80. It is also noted that the target tightening force F3 increases with an increase in the nominal thread diameter d of the bolt 80. In the present embodiment, therefore, the target compressive force Q is determined to be 3–30% of the target tightening force F3. That is, a predetermined percent value of the target compressive force Q with respect to the target tightening force F3 is selected within this range.

Then, the control flow goes to step S3 to initiate a wrenching operation with the compressive force Q initially set at "0". Described in detail, the solenoid-operated pressure control valve 48 is controlled such that a considerably low hydraulic pressure is applied to the hydraulic cylinder 20, and the solenoid-operated directional control valve 46 is operated to a position for moving down the socket wrench 44. In this condition, the motor 22 is operated at a relatively low speed. As a result, the socket 44 is lowered while it is rotated at a relatively low speed, so that the socket wrench 44 is brought into engagement with the head 86 of the bolt 80, for thereby rotating the bolt 80.

When a predetermined time has passed after the activation of the motor 22, step S4 is implemented to read the output signal of the torque detecting portion 60. Step S4 is followed by step S5 to determine whether a wrenching torque T produced by the motor 22 is substantially zero, more precisely, whether the wrenching torque T is smaller than a predetermined small value. If a negative decision (NO) is obtained in step S5, the control flow goes to step S6 to turn off the motor 22, and then goes to step S7 to activate a suitable alarm indicator such as a buzzer to inform the operator of some abnormality in the state of engagement between the externally threaded portion 82 of the bolt 80 and the internally threaded portion 84 of the first member 76.

If an affirmative decision (YES) is obtained in step S5, on the other hand, the control flow goes to step S8 in which the solenoid-operated pressure control valve 48 is controlled so that the hydraulic pressure of the hydraulic cylinder 20 corresponds to the target compressive force Q calculated in step S2. At this point of time, the externally threaded portion 82 is in engagement with the internally threaded portion 84, but a seat surface 88 of the head 86 of the bolt 80 is spaced apart from a seat surface 90 of the workpiece in the form of the second member 78, as shown in FIG. 5. In this condition, a thread surface 92 of the external thread 82 is in pressing contact with a thread surface 94 of the internal thread 84, as is apparent from an enlarged view of FIG. 6. Then, steps S9 and S10 are repeatedly implemented at a predetermined time interval, until the actual wrenching torque T has increased to a predetermined value $T_B$. Described more specifically, step S9 is implemented to read the actual wrenching torque value T and store the detected torque value T in the RAM 70, and step S10 is implemented to determine whether the detected actual torque value T is equal to or larger than the predetermined value $T_B$.

Figure 6:
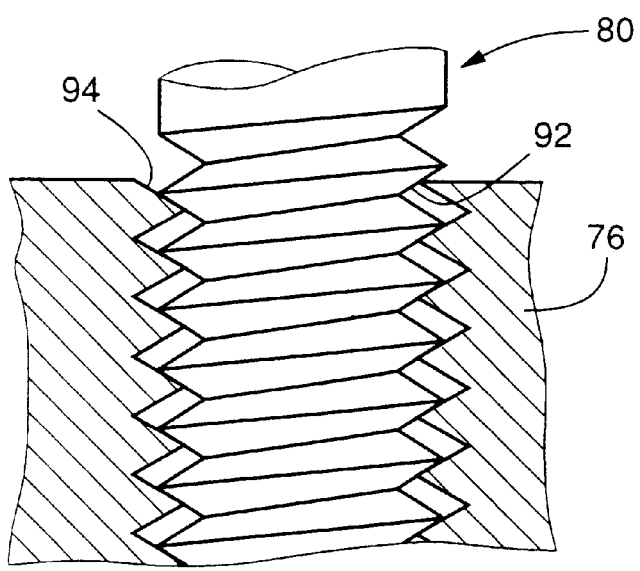
FIG. 6 is an enlarged view showing a part of externally and internally threaded members shown in FIG. 5.
Figure 7:
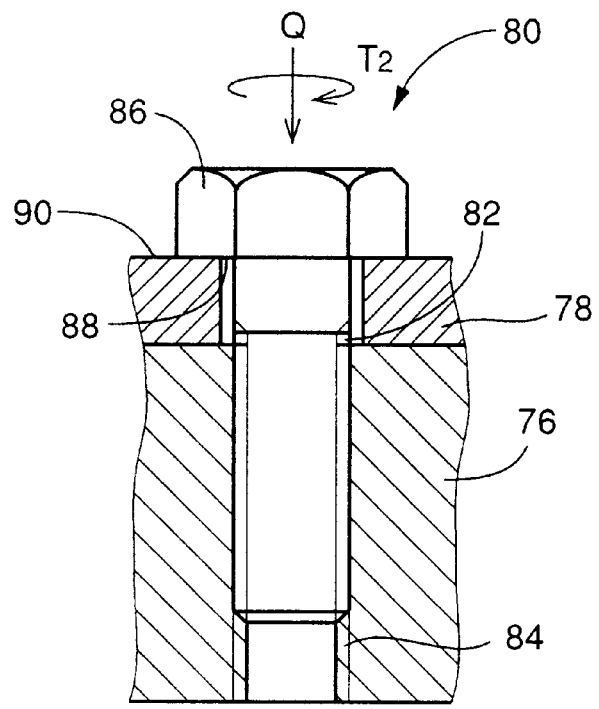
FIG. 7 is a view showing an intermediate stage of the wrenching operation of the apparatus of FIG. 1.

While steps S9 and S10 are repeatedly implemented, the seat surface 88 of the head 86 of the bolt 80 is seated on the seat surface 90 of the workpiece 78, as shown in FIG. 7. After this point of time, the thread surfaces 92, 94 of the external thread 82 and the internal thread 84 are held in substantially spaced-apart relationship with each other. Namely, the wrenching operation has entered an intermediate stage. The term "substantially spaced-apart relationship with each other" is interpreted to mean that the surface pressure between the thread surfaces 92, 94 is not so high as in an initial stage of the wrenching operation as indicated in FIGS. 5 and 6. This relationship does not exclude some local contact of the thread surfaces 92, 94 with a low contact pressure, due to some eccentricity of the bolt 80 and the tapped hole 84.

Figure 8:
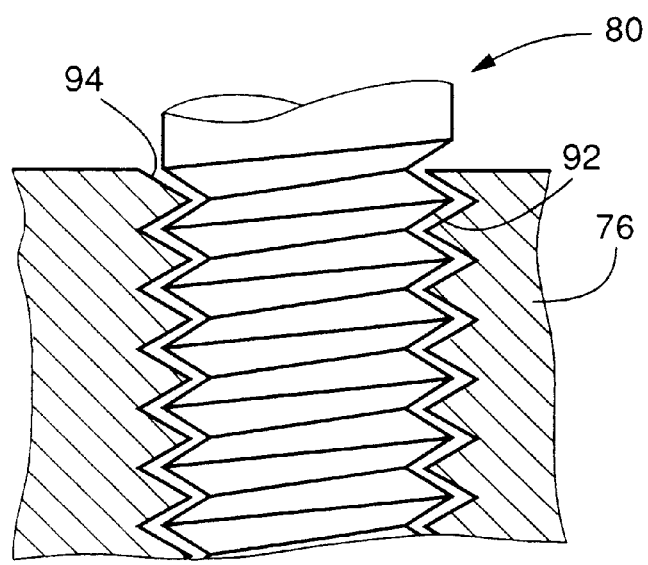
FIG. 8 is an enlarged view showing a part of the threaded members shown in FIG. 7.
Figure 9:
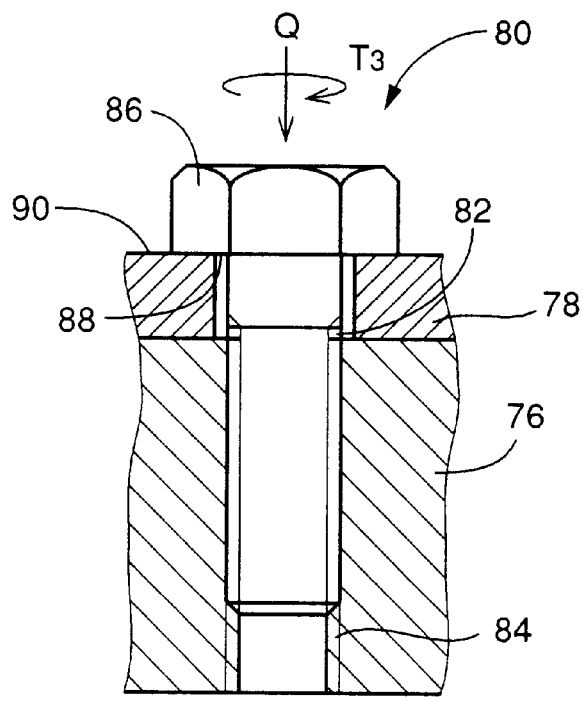
FIG. 9 is a view showing a final stage of the wrenching operation of the apparatus of FIG. 1.
Figure 10:
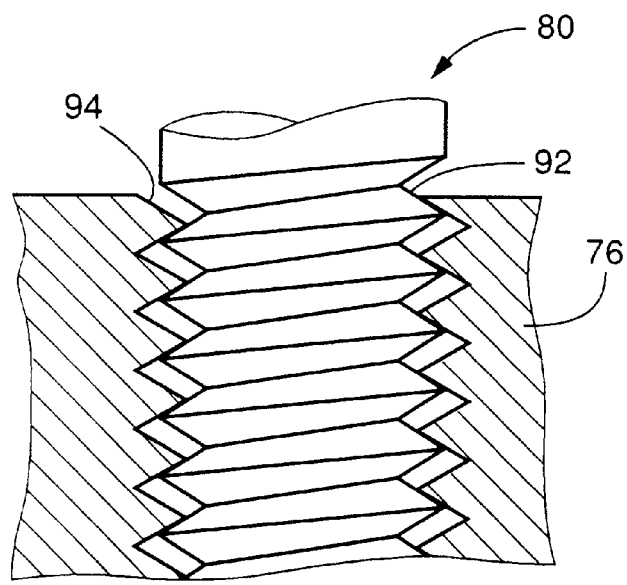
FIG. 10 is an enlarged view showing a part of the threaded members shown in FIG. 9.
Figures 11, 12:
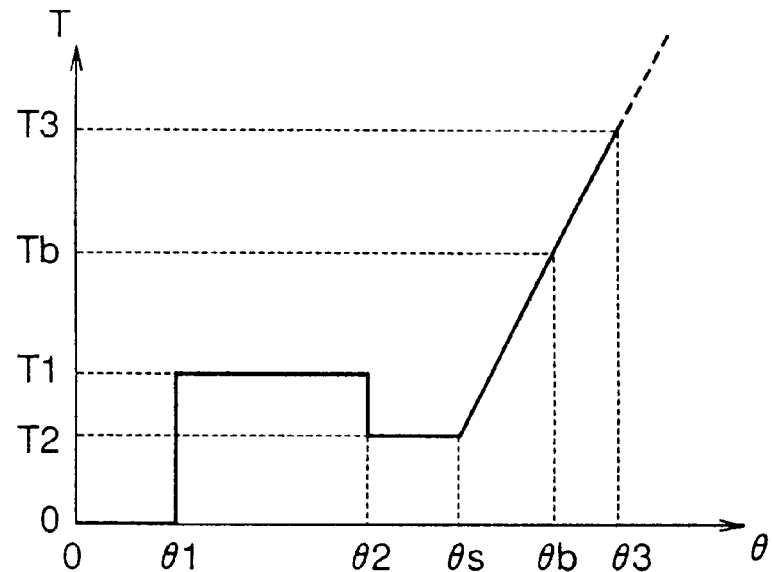
FIG. 11 is a graph indicating a change in wrenching torque in the wrenching operation of the wrenching apparatus of FIG. 1.
FIG. 12 is a fragmentary flow chart illustrating a part of a wrenching torque control routine according to a second embodiment of the invention.

When the bolt 80 is rotated by a further angle after the intermediate stage of FIG. 8 has been established, the wrenching operation has entered a final stage in which the thread surfaces 92, 94 are held in pressing contact with each other, as shown in FIGS. 9 and 10. However, the contacting flanks or sides 92, 94 of the threads 82, 84 in this final stage are different from those in the initial stage of FIGS. 5 and 6. That is, the lower flanks 92 contact the upper flanks 94 in the initial stage, while the upper flanks 92 contact the lower flanks 94 in the final stage, as seen in FIGS. 6 and 10. The actual wrenching torque T as detected by the torque detecting portion 60 during the wrenching operation consisting of the initial, intermediate and final stages varies with an increase in the rotation angle θ of the bolt 80, as generally indicated in the graph of FIG. 11.

When the actual wrenching torque T has increased to the predetermined value $T_B$, an affirmative decision (YES) is obtained in step S10, and the control flow goes to steps S11 and S12 to store an initial torque value T1 and an intermediate torque value T2 in respective initial and intermediate torque memories of the RAM 70. The initial torque value T1 is an average of the actual wrenching torque values T which were detected and stored in the RAM 70 in step S9 in the initial stage of the wrenching operation. The intermediate torque value T2 is a minimal value of the actual wrenching torque values T which were detected and stored in the RAM 70 in step S9. To find the minimal value, namely, the intermediate torque value T2, differences of the the two adjacent torque values T are calculated for all of the stored torque values T including the last detected value T which is equal to or larger than the predetermined value $T_B$. Each difference is a value obtained by subtracting the former one of the adjacent torque values T from the latter torque value T (which was detected next to the former one). One of the two adjacent torque values T whose difference is found negative for the first time is determined to be the intermediate torque value T2.

Step S12 is followed by step S13 to determine a target wrenching torque T3, according to an equation (3) given below, on the basis of the fact explained below.

In the initial stage of FIGS. 5 and 6, a friction torque $\xi \cdot Q$ is generated, where "$\xi$" represents a coefficient proportional to a friction coefficient $\mu s$ between the thread surfaces 92, 94, and "Q" represents the compressive force which is applied to the head 86 of the bolt 80 by the hydraulic pressure of the hydraulic cylinder 20, as discussed above. At the same time, a torque Tq is also generated in the initial stage, due to an effect of inclination of the thread surfaces 92, 94. This torque Tq acts on the bolt 80 in the direction for tightening the bolt 80, and is expressed by the following equation:

$$Tq = \zeta \cdot Q$$

wherein, $\zeta = (p/2\pi)$

Therefore, the initial torque value T1 necessary to rotate the bolt 80 in the tightening direction is represented by the following equation (1):

$$T1 = \xi \cdot Q - \zeta \cdot Q \tag{1}$$

In the intermediate stage of FIGS. 7 and 8, a friction torque $\eta \cdot Q$ is generated, where "$\eta$" represents a coefficient proportional to a friction coefficient $\mu w$ between the seat surfaces 88, 90. This friction torque $\eta \cdot Q$ is equal to the intermediate torque value T2 necessary to rotate the bolt 80 in the tightening direction in the intermediate stage, as indicated by the following equation (2):

$$T2 = \eta \cdot Q \tag{2}$$

In the final stage of FIGS. 9 and 10, a force (F+Q) acts between the seat surfaces 88, 90, where "F" is the force by which the workpiece (second member) 78 is clamped by the bolt 80 and the first member 76. Based on this force (F+Q), a friction torque $\eta \cdot (F+Q)$ is generated between the seat surfaces 88, 90. On the other hand, a rotation resistance torque $\xi \cdot F + \zeta \cdot F$ is generated based on the friction coefficient $\xi \cdot F$ between the thread surfaces 92, 94, the effect of inclination of the thread surfaces 92, 94 and the tightening or clamping force F. A sum of the friction torque $\eta \cdot (F+Q)$ and the rotation resistance torque $\xi \cdot F + \zeta \cdot F$ is equal to the wrenching torque T necessary to rotate the bolt 80 in the tightening direction, as indicated by the following equation (3):

$$T = \eta \cdot (F+Q) + \xi \cdot F + \zeta \cdot F \tag{3}$$

The coefficients $\xi$ and $\eta$ can be obtained from the above equations (1) and (2). The compressive force Q is detected by the compressive force detecting portion 62, and the tightening force F is the target value F3 which is read out from the RAM 70. Therefore, the target wrenching torque T3 can be calculated according to the above equation (3). That is, step S13 is implemented to perform a calculating operation according to the above equation (3).

Then, steps S14 and S15 are repeatedly implemented to read the detected actual wrenching torque value T and determine whether the detected torque value T has increased to the determined desired wrenching torque T3. That is, steps S14 and S15 are repeatedly implemented until the actual wrenching torque value T has reached the target value T3. If an affirmative decision (YES) is obtained in step S15, the control flow goes to step S16 to turn off the motor 22 through the driver 56. Thus, the wrenching operation is automatically terminated.

In the present embodiment, the coefficient $\xi$ which is one of friction coefficient quantities relating to the friction coefficient $\mu s$ between the thread surfaces 92, 94 is obtained based on the initial torque value T1 which is the rotation resistance torque or wrenching torque T in the initial stage of the wrenching operation. Further, the coefficient $\eta$ which is one of friction coefficient quantities relating to the friction coefficient $\mu w$ between the seat surfaces 88, 90 is obtained based on the intermediate torque value T2 which is the wrenching torque T in the intermediate stage. Based on these coefficients $\xi$ and $\eta$, the target wrenching torque value T3 is determined, so that the wrenching operation is automatically terminated when the actual wrenching torque T has become equal to the target value T3 in the final stage. Accordingly, the bolt 80 can be tightened with a substantially constant tightening force, namely, with the target clamping or tightening force F3, without an influence of a variation in the thread surface friction coefficient $\mu s$ and the seat surface friction coefficient $\mu w$, which variation may take place due to varying amounts of an oil adhering to the thread surfaces 92, 94 and the seat surfaces 88, 90, and due to varying surface roughness values of these surfaces 88–94.

It will be understood from the foregoing description of the present first embodiment of this invention that the hydraulic cylinder 20 constitutes an axial force applying device for applying an axial force to a rotary threaded member in the form of the bolt 80, and that the motor 22 and the socket wrench 44 constitute a major portion of a rotary driving device for rotating the rotary threaded member. It will also be understood that a portion of the microcomputer 54 assigned to implement steps S11–S13 constitutes wrenching operation terminating condition determining means for determining a condition for terminating a wrenching operation, and that a portion of the microcomputer 54 assigned to implement steps S14–S16 constitutes termination commanding means for generating a command for turning off the rotary driving device. It will also be understood that the first member 76 is a stationary threaded member which cooperates with the rotary threaded member 80 to tighten or clamp the workpiece in the form of the second member 78.

Referring to the flow chart of FIG. 12, there will be described a second embodiment of this invention, wherein step S12 is implemented in place of step S12 of the wrenching torque control routine of FIG. 4, to determine the intermediate torque value T2 on the basis of a rate of change of the actual wrenching torque T. Described in detail, differences of adjacent two torque values T stored in the RAM 70 until the torque value T has reached the predetermined value $T_B$ are successively calculated to obtain a plurality of change rates (gradients) dT/dt of the wrenching value T. The first change rate which is lower than a predetermined threshold is determined to be the intermediate torque value T2.

Figure 13:
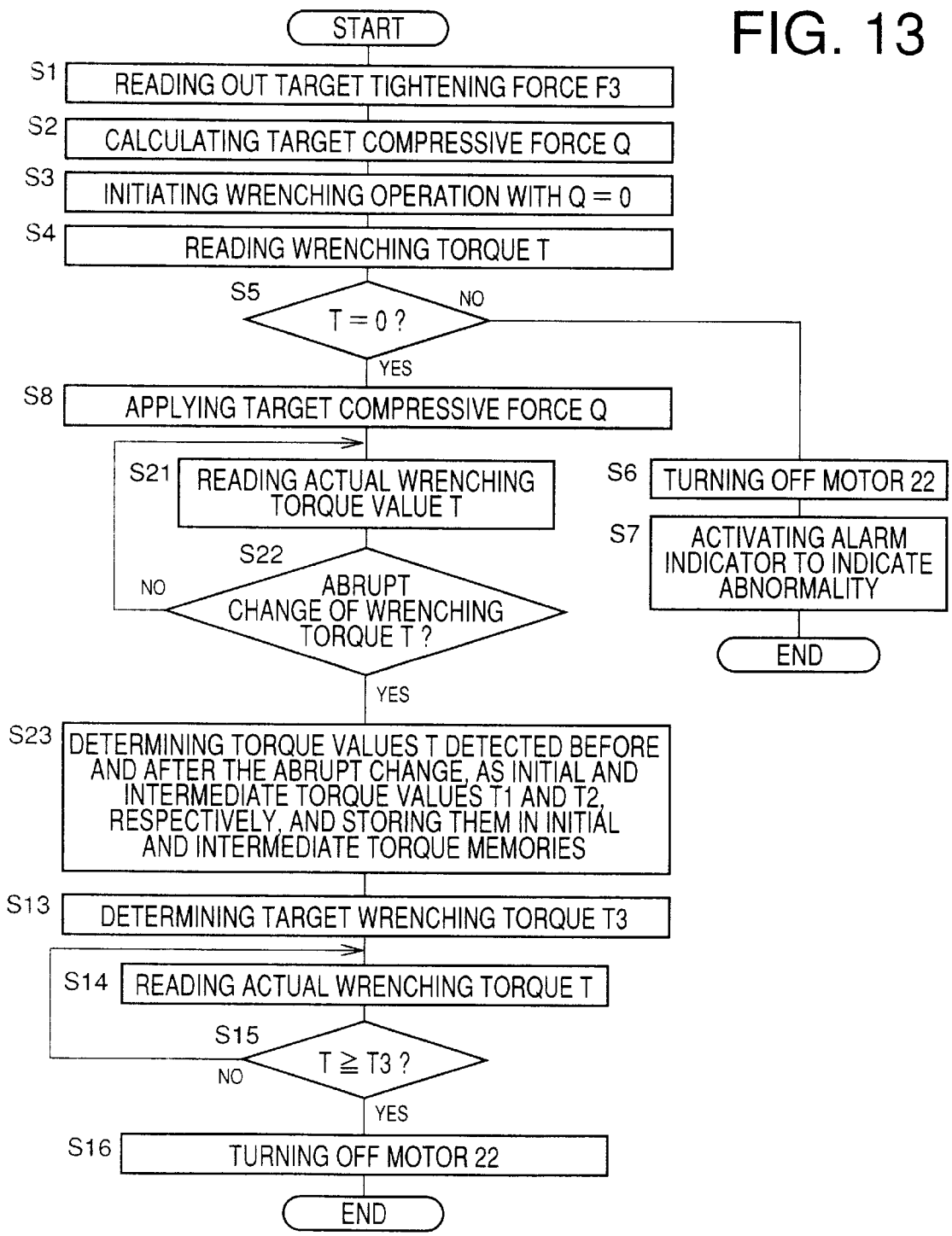
FIG. 13 is a flow chart illustrating a wrenching torque control routine according to a third embodiment of this invention.

According to a third embodiment of this invention, a wrenching torque control routine illustrated in the flow chart of FIG. 13 is executed in place of the routine of FIG. 4. Steps S1–S8 and S13–S16 of this routine of FIG. 13 are identical with those of the routine of FIG. 4, but steps S21–S23 are different from the corresponding steps S9–S12 of the routine of FIG. 4. That is, the manner of determining the initial and intermediate torque values T1 and T2 in the respective initial and intermediate stages in the present third embodiment is different from that in the first embodiment of FIG. 4. Step S21 is implemented to read the actual wrenching torque value T. Step S21 is followed by step S22 to determine whether the actual wrenching torque T detected in step S8 has abruptly changed. Steps S21 and S22 are repeatedly implemented until an abrupt change of the detected torque value T takes place. The determination in step S22 is effected by determining whether a difference between two successively detected torque values T exceeds a predetermined upper limit threshold. If an affirmative decision (YES) is obtained in step S22, the control flow goes to step S23 in which the two successively detected torque values T are determined as the initial and intermediate torque values T1, T2, respectively, and stored in the initial and intermediate torque memories of the RAM 70.

Figure 14:
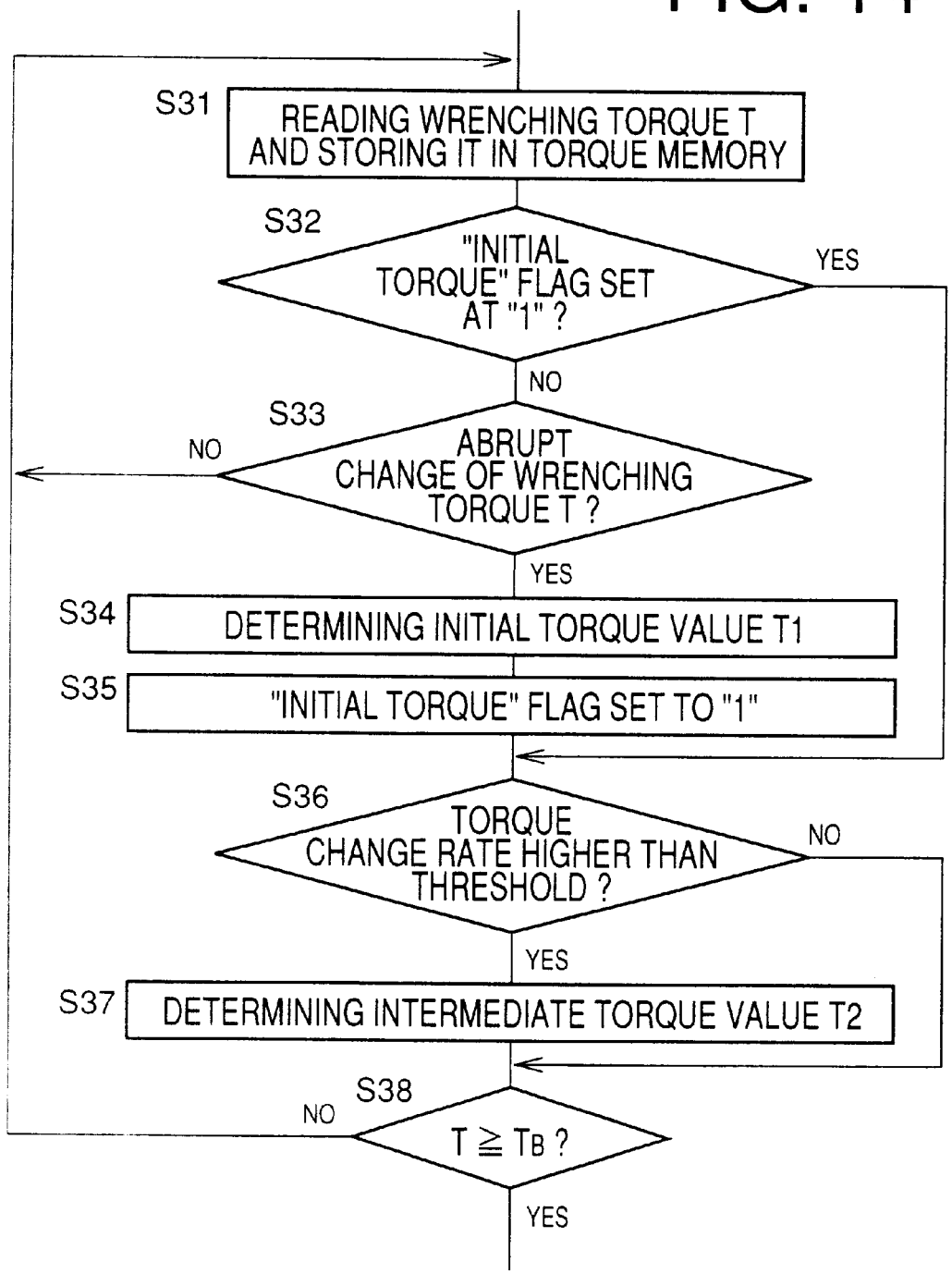
FIG. 14 is a fragmentary flow chart illustrating a part of a wrenching torque control routine according to a fourth embodiment of the invention.

In a fourth embodiment of the invention, steps S31–S38 illustrated in the flow chart of FIG. 14 are implemented in place of steps S9–S12 of FIG. 4, to determine the initial and intermediate torque values T1, T2. In this embodiment, steps S31–S38 are repeatedly implemented at a predetermined time interval until an affirmative decision (YES) is obtained in step S38, during which the initial and intermediate torque values T1, T2 are determined. Described in detail, step S31 is provided to read the detected wrenching torque T and store it in the torque memory of the RAM 70. Then, step S32 is implemented to determine whether an INITIAL TORQUE flag is set at "1". This INITIAL TORQUE flag is set to "1" in step S34 after the initial torque value T1 has been determined as described below. Initially, this flag is set at "0", and a negative decision (NO) is obtained in step S32, so that step S33 is implemented to determine whether the detected actual wrenching torque T has abruptly changed. The determination in step S33 is effected by determining whether a difference between two successively detected torque values T exceeds a predetermined upper limit threshold, as in step S21 of FIG. 13.

If a negative decision (NO) is obtained in step S33, the control flow goes back to step S31. If an affirmative decision (YES) is obtained in step S33, it means that the initial stage has ended or the intermediate stage has commenced. In this case, the control flow goes to step S34 in which an average of a predetermined number of actual wrenching torque values T successively detected immediately before the end point of the initial stage (corresponding to θ2 in FIG. 11) is determined as the initial torque value T1. Step S34 is followed by step S35 to set the INITIAL TORQUE flag to "1". Once step S34 has been implemented, an affirmative decision (YES) is obtained in step S32, the control flow from step S31 to step S36 while by-passing steps S33–S35, and steps S36, S38, S31 and S32 are repeatedly implemented. Step S36 is provided to determine whether a rate of change of the wrenching torque T exceeds a predetermined upper limit threshold. If an affirmative decision (YES) is obtained in step S36, it means that the intermediate stage has ended or the final stage has commenced. In this case, the control flow goes to step S37 in which an average of a predetermined number of actual wrenching torque values T successively detected immediately before the end point of the intermediate stage (corresponding to θS in FIG. 11) is determined as the intermediate torque value T2. Then, the control flow goes to step S38 to determine whether the actual wrenching torque T has increased to the predetermined value $T_B$. If an affirmative decision (YES) is obtained in step S37, the control flow goes to step S13 and the following steps of FIG. 13.

In the present fourth embodiment, the termination of the initial stage is determined based on an abrupt change (decrease) of the detected actual wrenching torque T, while the termination of the intermediate stage is determined based on an increase rate of the torque T higher than the threshold. Thus, suitable numbers of the detected torque values T in terminal portions of the initial and intermediate stages are used to determine the initial and intermediate torque values T1, T2. Accordingly, these values T1, T2 can be obtained with comparatively high reliability.

Figure 15:
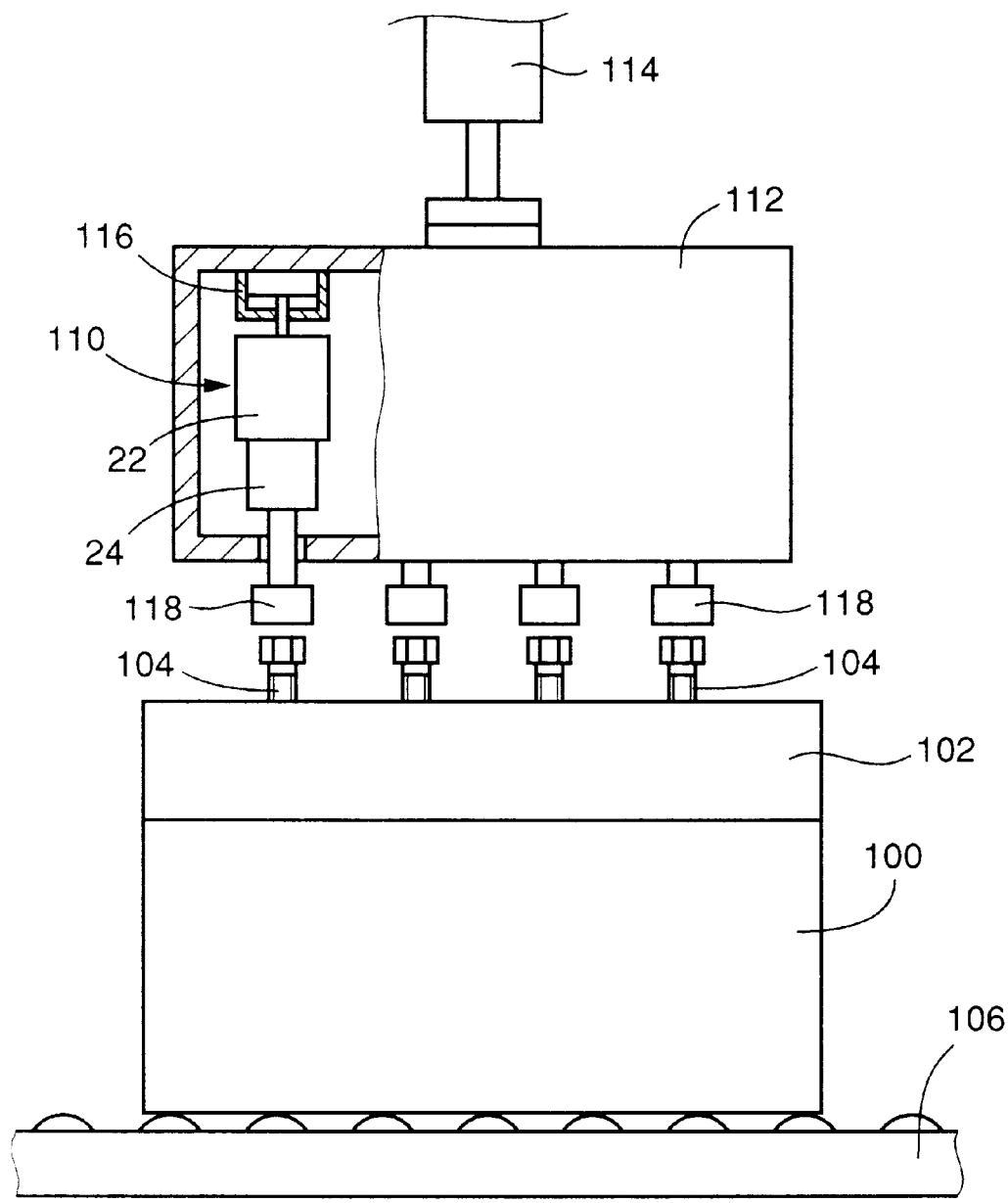
FIG. 15 is an elevational view partly in cross section showing a wrenching apparatus constructed according to a fifth embodiment of the invention.

Referring to FIG. 15, a wrenching apparatus according to a fifth embodiment of this invention is adapted to fastening or tightening relatively large workpieces together, for instance, tighten a cylinder head 102 to a cylinder block 100 of an engine, by a plurality of bolts 104. To this end, the cylinder head 102 is first placed on the cylinder block 100, as shown in FIG. 15, and the bolts 104 are slightly screwed into respective tapped holes (internally threaded portions) formed in the cylinder block 100. In this condition, the cylinder block 100 and the cylinder head 102 are moved by a conveyor 106 to a predetermined bolt wrenching station. Above the cylinder head 102 placed in the bolt wrenching station, there is disposed an elevator housing 112 of the wrenching apparatus. The elevator housing 112 incorporates a plurality of wrenching units 110 having respective socket wrenches 118 at their lower end portions. The elevator housing 112 is supported by a suitable frame such as a ceiling wall of a work shop, through an elevating device such as a hydraulic cylinder 114. Of course, it is desirable to guide the elevator housing 112 by a suitable guide. Each of the wrenching units 110 is similar to that of the wrenching apparatus of FIG. 1, except that the linear guide 16 is fixed to the elevator housing 112 and that a diaphragm type fluid-operated actuator 116 is used in place of the hydraulic cylinder 20. While the fluid-operated actuator 116 may be a hydraulic or pneumatic actuator, the hydraulic actuator is desirably used since it can be small-sized.

When the cylinder block 100 and the cylinder head 102 have been transferred to the bolt wrenching station, the elevator housing 112 which has been held at an elevated position is lowered by the hydraulic cylinder 114 to an operating position, in which the socket wrenches 118 are located above and near the heads of the bolts 104. Then, the fluid-operated actuators 116 of the wrenching units 110 are operated with a relatively low pressure, to bring the socket wrenches 118 into engagement with the heads of the bolts 104, and a wrenching operation is initiated in the same manner as described above with respect to the first embodiment of FIGS. 1–11.

Figure 16:
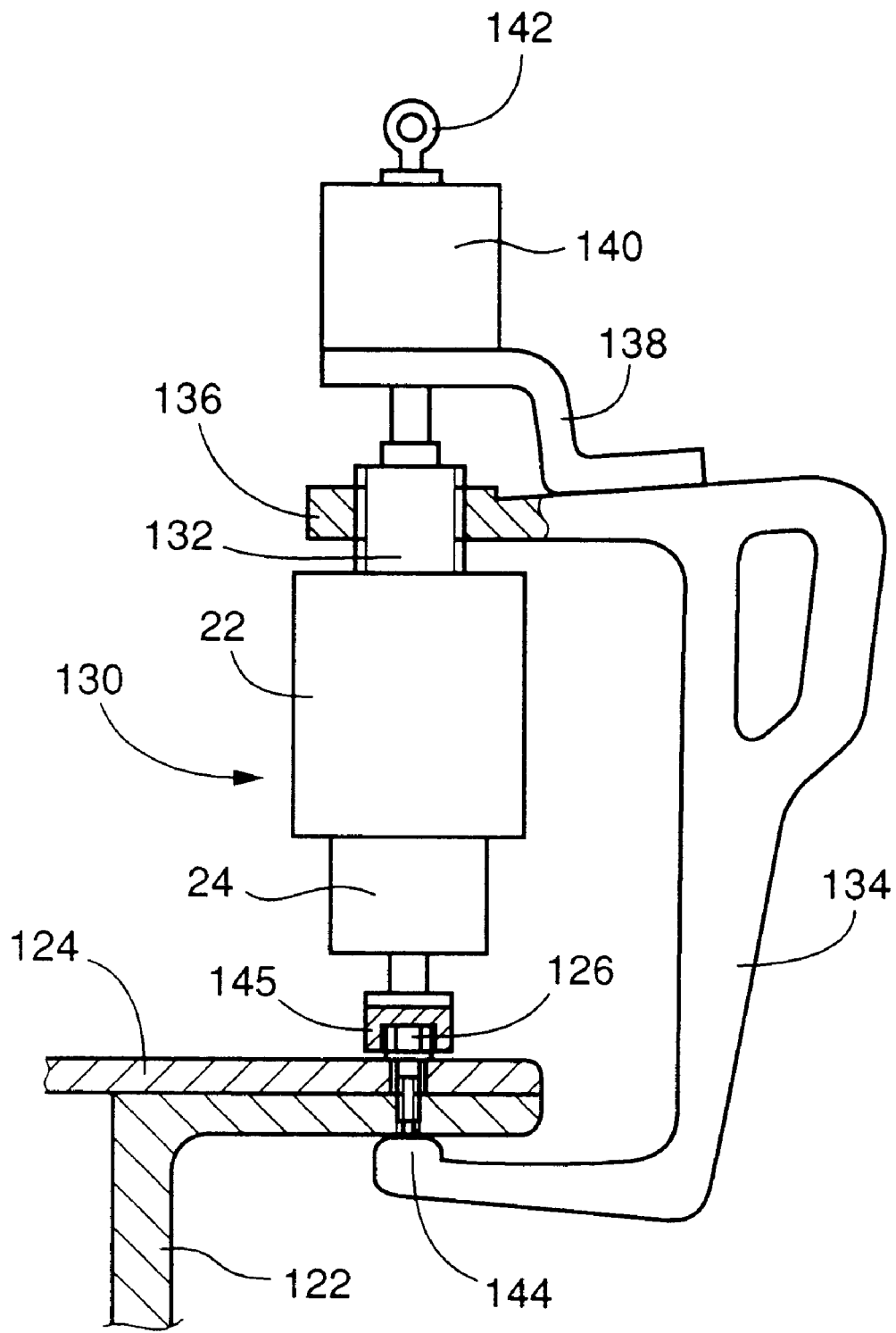
FIG. 16 is an elevational view partly in cross section showing a wrenching apparatus constructed according to a sixth embodiment of the invention.

A sixth embodiment of the present invention will be described by reference to FIG. 16 showing a wrenching apparatus adapted to fasten a large second member 124 to a large first member 122 by a bolt 126. The wrenching apparatus includes a wrenching unit 130, which has the motor 22 and detector 24 provided in the apparatus of FIG. 4. The motor 22 has an engaging portion 132 which engages an engaging portion 136 of a caliper 134 such that the two engaging portions 132, 136 are not rotatable relative to each other and are axially movable relative to each other. An air cylinder 140 is attached to the caliper 136 through a bracket 138. The air cylinder 140 is provided to move the motor 22 and the detector 24 relative to the caliper 134 in the axial direction of the motor 22. A suitable member such as an eye-bolt 142 is fixed to the air cylinder 140 or the caliper 134, so that the wrenching apparatus is suspended by a suitable load balancer connected to the eye-bolt 142. In operation of the present wrenching apparatus of FIG. 16, the air cylinder 140 is activated while a lower abutting portion 144 of the caliper 136 is abuttable onto the underside of the first member 122. As a result, a compressive force acts on the bolt 126 through a socket wrench 145 attached to the end of the detector 24. A reaction force is transmitted to the first member 122 through the bracket 138 and the caliper 134. Thus, the desired compressive force is applied to the bolt 126. The operation of the wrenching unit 130 is identical with that of the wrenching apparatus of FIG. 1.

Figure 17:
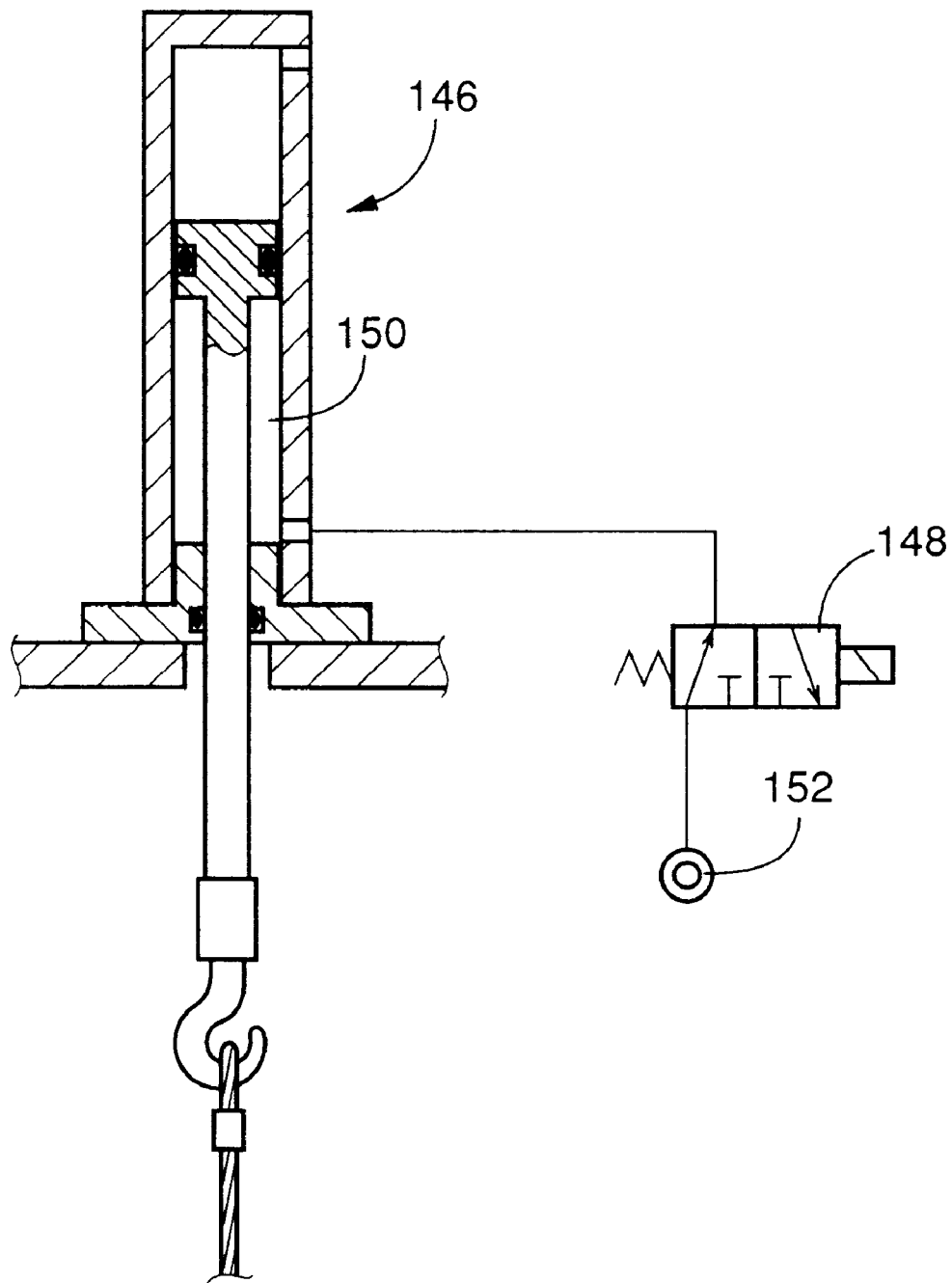
FIG. 17 is an elevational view in cross section showing an axial force applying device of a wrenching apparatus constructed according to a seventh embodiment of the invention.

Reference is now made to FIG. 17 showing a wrenching apparatus constructed according to a seventh embodiment of this invention. In the present embodiment, the axial force applying device is adapted such that the weight of the motor 22, detector 24, etc. is utilized as the compressive force to be applied to the rotary threaded member such as a bolt or nut. The axial force applying device includes the motor 22, detector 24, a load balancer 146 for suspending the motor 22, detector 24, etc., and a releasing device in the form of a solenoid-operated direction control valve 148 for releasing a load balancing operation of the load balancer 146. The solenoid-operated directional control valve 148 is controlled such that compressed air is kept supplied to a pressure chamber 150 of the load balancer 146 to hold the load balancer 146 in a load balancing position thereof until the socket wrench rotated by the motor 22 is brought into engagement with the head of the bolt, so that the weight of the motor 22, etc. does not act on the operator of the apparatus. After the engagement of the socket wrench with the bolt head, the solenoid-operated directional control valve 148 is switched to expose the pressure chamber 150 to the atmosphere, so that the weight of the motor 22, etc. acts on the bolt as the compressive force.

Figure 18:
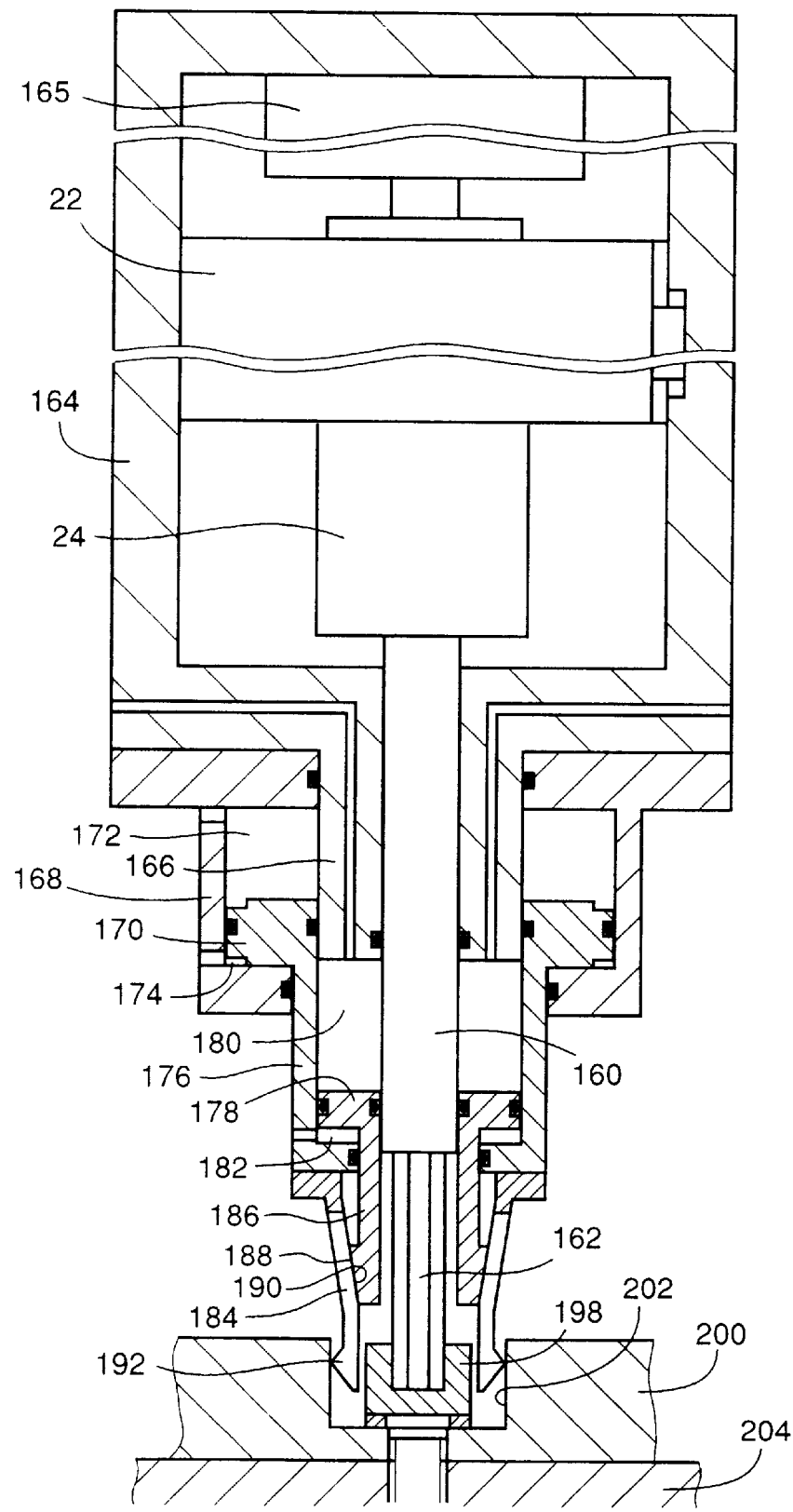
FIG. 18 is an elevational view partly in cross section showing a wrenching apparatus constructed according to an eighth embodiment of the invention.

A wrenching apparatus according to an eighth embodiment of the present invention will be described referring to FIG. 18. This wrenching apparatus of FIG. 18 is provided with a mechanical engaging portion which is different from a mechanical engaging portion in the form of the abutting portion 144 which is provided in the sixth embodiment of FIG. 16 for mechanically engaging the stationary threaded member 122. This mechanical engaging portion provided in the eighth embodiment is adapted to engage a workpiece to be fastened. The wrenching apparatus of FIG. 18 has the motor 22 and the detector 24 provided in the apparatus of FIG. 4, and an output shaft 160 extends from the end of the detector 24. The output shaft 160 carries a wrench in the form of a hexagon wrench key 162 fixed to its free end. The motor 22 and the detector 24 are accommodated in a casing 164 such that the motor 22 and detector 24 are movable relative to the casing 164 and are not rotatable relative to the casing 164. Between the casing 164 and the motor 22, there is disposed a fluid-operated cylinder 165, which is operated to move the motor 22, detector 24, etc. relative to the casing 164. The casing 164 has a small-diameter end portion 166 on which is fixedly fitted an annular first cylinder 168. An annular first piston 170 is disposed within the first cylinder 168 such that the first piston 170 slidably and fluid-tightly engages the inner circumferential surface of the first cylinder 168 and the outer circumferential surface of the small-diameter end portion 166. The first cylinder 168 and the first piston 170 cooperate to define two pressure chambers 172, 174 on the opposite sides of the first piston 170.

An annular second cylinder 176 is formed integrally with the annular first piston 170, and an annular second piston 178 slidably and fluid-tightly engages the second cylinder 176. The second cylinder 176 and the second piston 178 cooperate to define two pressure chambers 180, 182 on the opposite sides of the second piston 178. The second cylinder 176 carries a collet 184 fixed to its free end, while the second piston 178 carries carries a tapered member 186 fixed to its free end. The tapered member 186 engages the inner circumferential surface of the collet 184. Described more specifically, the collet 184 has an inner tapered surface 190 which engages an outer tapered surface 188 of the tapered member 186. The collet 184 has a free end portion having a plurality of axially extending slits formed therethrough, so that the free end portion is divided into a plurality of sections. When the tapered member 186 is moved relative to the collet 184 in the direction away from the first cylinder 168, the diameter of the collet 184 at its free end increases. Each of the sections of the free end portion of the collet 184 has an engaging tab 192 at its free end such that the engaging tab 192 protrudes in the radially outward direction of the collet 184.

A pressurized fluid (working oil or compressed air) is normally supplied to the pressure chambers 174, 182, so that the first piston 170 is held in its fully advanced position while the second piston 178 is held in its fully retracted position. In this condition, the free end portion of the collet 184 is inserted into an annular space between the inner circumferential surface of a hole 202 formed in a workpiece 200 and the outer surface of the head of a bolt 198. Then, the pressurized fluid is supplied to the pressure chamber 180 to advance the second piston 178 to its fully advanced position, so that the diameter of the collet 184 is increased by the tapered member 186. As a result, the engaging tabs 192 are forced against the inner circumferential surface of the hole 202. Thus, the casing 164 is engaged with the workpiece 200 via the collet 184, second cylinder 176, first piston 170, first cylinder 168, etc. It will be understood that the collet 184 and tapered member 186, and the first and second cylinders 168, 176 for operating these members 184, 186 cooperate to constitute the mechanical engaging portion. For the engaging tabs 192 of the mechanical engaging portion to engage the workpiece 200, the diameter of the hole 202 need to be slightly larger than that of a counterbore conventionally provided for a bolt. Further, the inner circumferential surface of the hole 202 desirably has a circumferential groove for engagement with the engaging tabs 192. After the engagement of the casing 164 with the workpiece 200, the motor 22, detector 24 and output shaft 160 are advanced by the fluid-operated cylinder 165 relative to the casing 164, while the motor 22 is operated, whereby the hexagon wrench key 162 is brought into engagement with a hexagon hole formed in the head of the bolt 198.

With the hydraulic pressure of the fluid-operated cylinder 165 in this condition, a compressive force is applied from the hexagon wrench key 162 to the bolt 198. A reaction force produced as a result of application of the compressive force from the hexagon wrench key 162 to the bolt 198 is transmitted to the workpiece 200 through the casing 164, collet 184, etc. When the weight of the workpiece 200 is sufficiently larger than the compressive force applied from the hexagon wrench key 162 to the bolt 198, the workpiece 200 will not be raised away from a stationary threaded member in the form of an internally threaded member 204.

When the weight of the workpiece 200 is smaller than the compressive force, the workpiece will be raised away from the internally threaded member 204, and the compressive force acting on the bolt 198 is not sufficient. To prevent this drawback where the workpiece 200 is fastened to the internally threaded member 204 by a plurality of bolts 198, a selected one or ones of the bolts 198 is/are tentatively or provisionally wrenched by a conventional method not according to the principle of the present invention, and then the remaining bolts 198 are wrenched according to the present invention, namely, by operating the wrenching apparatus of FIG. 18. Then, the provisionally wrenched bolt or bolts 198 is/are loosened and wrenched again by the present wrenching apparatus. When the weight of the workpiece 200 is relatively small, only one bolt 198 is provisionally wrenched by the conventional method. When the weight of the workpiece 200 is relatively large, the number of the bolts 198 that are provisionally wrenched is determined depending upon the weight.

Figure 19:
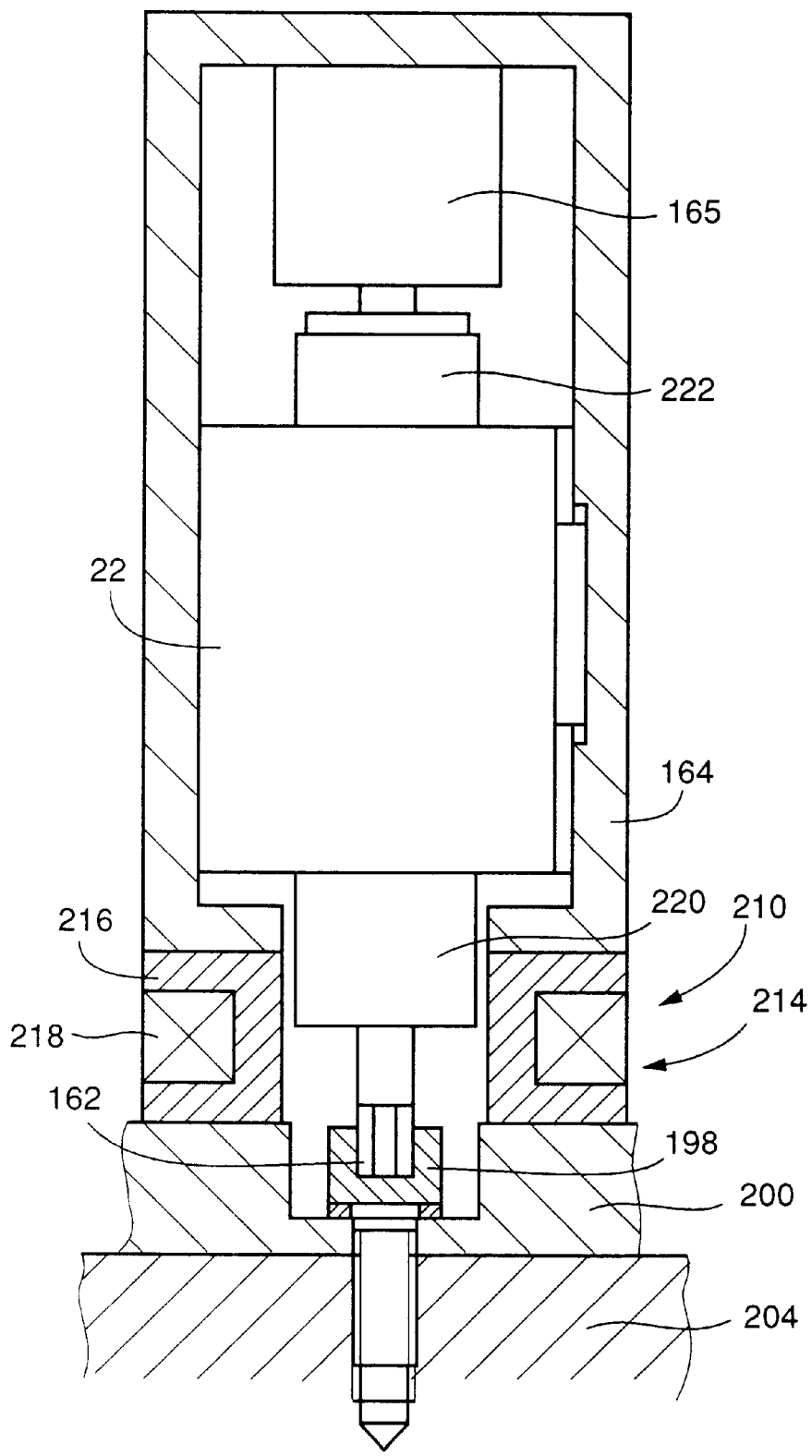
FIG. 19 is an elevational view partly in cross section showing a wrenching apparatus constructed according to a ninth embodiment of the invention.

The mechanical engaging portion provided in the sixth and eighth embodiments of FIGS. 16 and 18 may be replaced by an electromagnetic engaging portion 210 constructed according to a ninth embodiment of this invention shown in FIG. 19. The electromagnetic engaging portion 210 includes an electromagnet 214 attached to the lower end of the casing 164. The electromagnet 214 includes an iron core 216, and a coil 218 wound on the iron core 216. When the coil 218 is energized with an electric current, the casing 164 is attracted to the workpiece 200 by a magnetic force. The casing 164 is released from the workpiece 200 when the coil 218 is de-energized. Thus, the casing 164 may be easily fixed to and removed from the workpiece 200 by energizing and de-energizing the coil 218. While the electromagnet 214 used in the embodiment of FIG. 19 has an annular shape, this electromagnet 214 may be replaced by an array of a plurality of separate electromagnets attached to the casing 164. In the embodiment of FIG. 19, the detector 24 includes a torque detector 220 and an axial force detector 222. While the wrenching apparatus of FIG. 19 is adapted to evaluate the thread surface friction coefficient and the seat surface friction coefficient while a compressive force acts on the bolt 198, the wrenching apparatus may be modified to evaluate the friction coefficients while a tensile force acts on the bolt 198. This modification may be accomplished by modifying the head of the bolt and the hexagon wrench key, as described below by reference to FIGS. 27 and 28.

Figure 20:
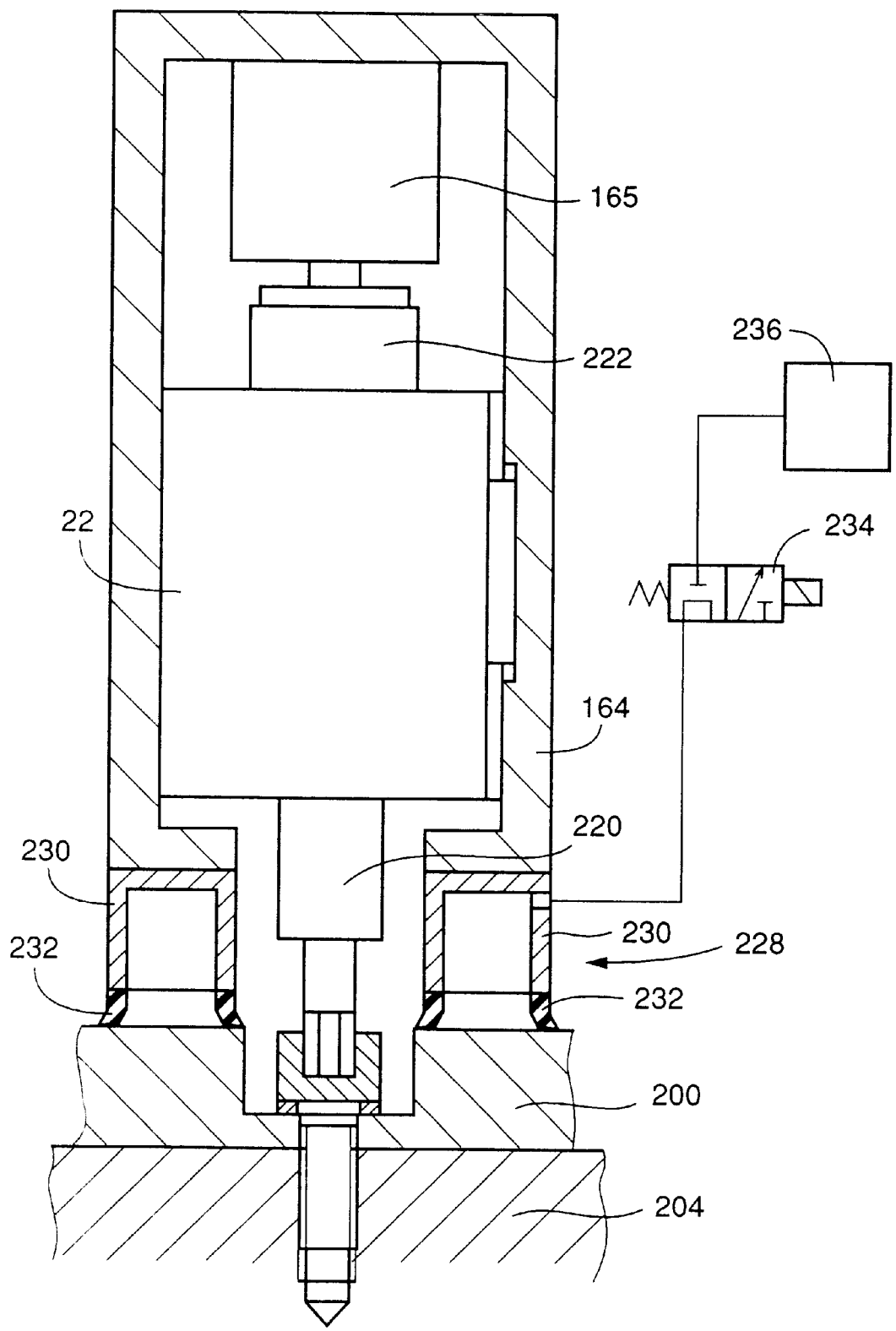
FIG. 20 is an elevational view partly in cross section showing a wrenching apparatus constructed according to a tenth embodiment of the invention.

The electromagnetic engaging portion 210 of FIG. 19 may be replaced by a vacuum engaging portion 228 constructed according to a tenth embodiment of this invention shown in FIG. 20. The vacuum engaging portion 228 includes a plurality of cup-shaped sucker bodies 230 fixed to the casing 164, and a plurality of sealing members in the form of suckers 232 provided at the open ends of the sucker bodies 230. The interior of each sucker body 230 is connected to a vacuum source 236 through a vacuum control device in the form of a solenoid-operated directional control valve 234. With the directional control valve 234 being suitably controlled, the vacuum engaging portion 228 is operated between a sucking position and a non-sucking position.

The present vacuum engaging portion 228 as well as the electromagnetic engaging portion 210 may be arranged so as to act directly on the internally threaded member 204 where the workpiece 200 is relatively small. Further, the workpiece 200 may have a through-hole or through-holes, or a cutout or cutouts, through which the electromagnet 214 or electromagnets or the suckers 232 acts or acts directly on the internally threaded member 204.

Figure 21:
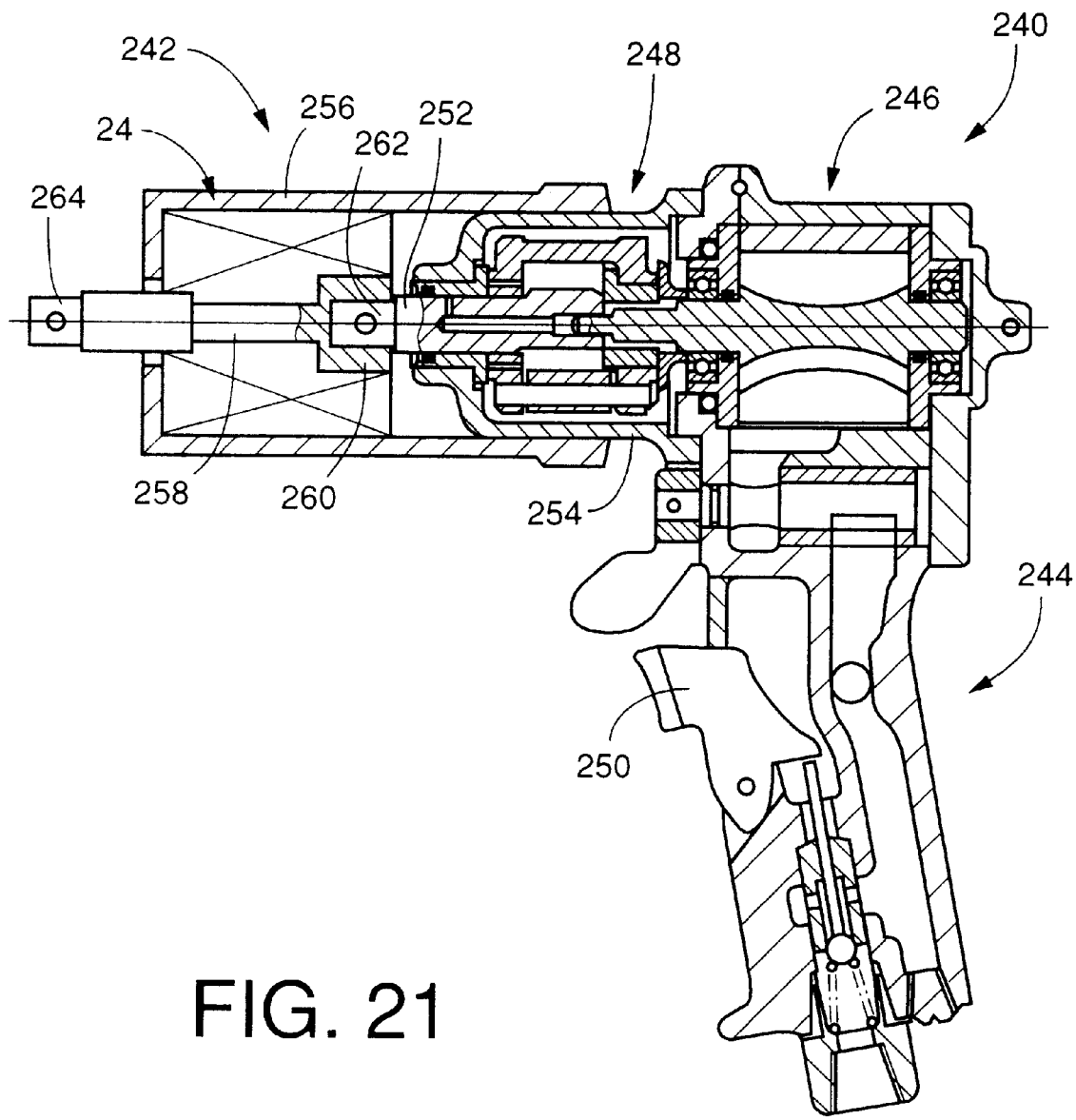
FIG. 21 is an elevational view in cross section showing a wrenching apparatus constructed according to an eleventh embodiment of the invention.

While the entirety of the wrenching apparatus of each of the preceding embodiments is constructed according to the present invention, a wrenching apparatus may be obtained by attaching an attachment 242 to an impact wrench 240 which is a conventional wrenching device, as shown in FIG. 21. Since detailed description of the known impact wrench 240 is deemed unnecessary, the impact wrench 240 will be briefly explained. The impact wrench 240 includes a pressure input portion 244, a motor portion 246 and an impact portion 248. The motor portion 246 is an air motor of vane type, for example. The pressure input portion 244 has an operating member 250 which is manually operated to apply compressed air to the motor portion 246 for thereby turning on the motor portion 246, so that an output shaft 252 of the motor portion 246 is rotated. The impact portion 248 is adapted to apply an intermittent impact to the output shaft 252 in the rotating direction.

To a casing 254 of the impact wrench 240, there is attached an auxiliary casing in the form of an attachment casing 256. Within the attachment casing 256, there is accommodated the detector 24 described above with respect to the first embodiment by reference to FIG. 2. The detector 24 has a detecting shaft 258 having a connector end portion 260, which engages a polygon wrench driver 262 provided at the free end portion of the output shaft 252 of the motor 246 of the impact wrench 240. The connector end portion 260 is rotated with the polygon driver 262, and is adapted to receive a compressive force from the output shaft 252. The detecting shaft 258 carries a polygon driver 264 at its free end. A suitable socket wrench or hexagon wrench key is attached to the polygon driver 264 for rotating the rotary threaded member. The detector 24 is controlled by a control device as indicated at 50 in FIG. 1, which activates a buzzer or other suitable indicator when the wrenching torque detected by the detector 24 has increased to a target value. Upon activation of the indicator, the operator releases the operating member 250 to turn off the motor 246. Alternatively, an air passage connected to the pressure input portion 244 is provided with a suitable control valve such as a solenoid-operated shut-off valve, which is activated to close the air passage to automatically terminate the wrenching operation when the detected wrenching torque has reached the target value.

While the wrenching apparatus of FIG. 21 according to an eleventh embodiment of this invention utilizes the impact wrench 240 having the impact portion 248, the attachment 242 may be attached to a conventional wrench without an impact portion. Conversely, the electric motor 22 used in the various embodiments described above may be replaced by an air motor, or by a combination of an air motor and an impact portion to provide an impact wrench as shown in FIG. 21. For improving the accuracy of evaluation of the thread surface friction coefficient and the seat surface friction coefficient, however, it is desirable that the impact portion be inhibited from operating in the initial and intermediate stages of the wrenching operation.

Figure 22:
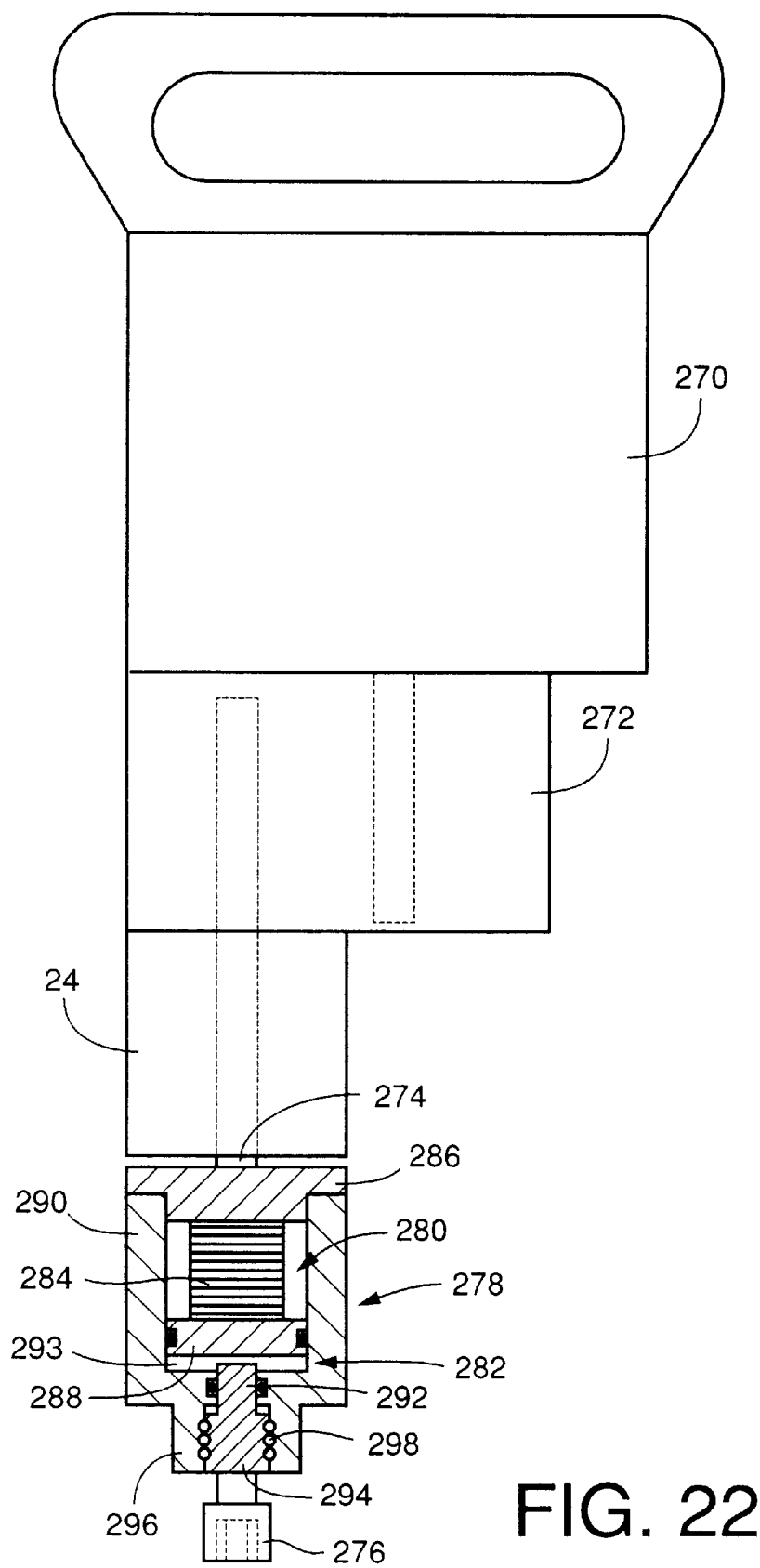
FIG. 22 is an elevational view partly in cross section showing a wrenching apparatus constructed according to a twelfth embodiment of the invention.

Referring next to FIG. 22, there will be described a wrenching apparatus constructed according to a twelfth embodiment of the present invention. This wrenching apparatus includes a motor portion 270 to which are attached a speed reducer 272 and the detector 24 described above. Between an output shaft 274 of the detector 24 and a wrench member 276, there is disposed a length changeable device 278 which includes an actuator portion 280 and a displacement booster portion 282. The actuator portion 280 is principally constituted by a laminar piezoelectric element 284. The output shaft 274 has a large-diameter support portion 286 formed at its free end, while the displacement booster portion 282 has a large-diameter piston 288. The piezoelectric element 284 is interposed between the support portion 286 and the piston 288.

The displacement booster portion 282 has a cylinder 290 and a small-diameter piston 292 as well as the large-diameter piston 288, which cooperate to define an enclosed space 293 filled with a working fluid. When the laminar piezoelectric element 284 is elongated, the large-diameter piston 288 is advanced relative to the cylinder 290, and the small-diameter piston 292 is advanced by a distance larger than a distance of the advancing movement of the large-diameter piston 288. Thus, the displacement booster portion 282 is of a hydraulic type. The small-diameter piston 292 has an integrally formed ball-spline shaft 294, while the cylinder 290 has an integrally formed ball-spline hole portion 296. These ball-spline shaft 294 and ball-spline hole portion 296 engage each other through a plurality of balls 298, without a backlash, so as to effectively prevent relative rotation between the small-diameter piston 292 and the cylinder 290.

When the laminar piezoelectric element 284 is elongated upon energization thereof while the wrench member 276 is in engagement with a rotary threaded member, the large-diameter piston 288 is advanced relative to the cylinder 290, so that the small-diameter piston 294 is advanced by a larger distance than the large-diameter piston 288. Namely, the length between the support portion 286 and the ball-spline shaft 294 of the length changeable device 278 is increased. At this time, the wrench member 276 which is in engagement with the rotary threaded member cannot be advanced, but an inertia mass portion including the motor portion 270, speed reducer 272 and detector 24 is retracted. As a result, the wrench member 276 receives an inertial force corresponding to a product of the mass and the acceleration of the inertia mass portion. In the present embodiment, the inertia mass portion and the length changeable device 278 constitute the axial force applying device.

In the present embodiment, the thread surface friction coefficient and the seat surface friction coefficient can be evaluated based on the outputs of the detector 24 in the initial and intermediate stages of the wrenching operation, by intermittently energizing the piezoelectric element 284 for repeated elongation thereof at a predetermined relatively short time interval, and by reading the outputs of the detector 24 in synchronization with the elongation of the piezoelectric element 284, while the thread surfaces of the rotary and stationary threaded members and the seat surfaces of the rotary threaded member and the workpiece are forced against each other with a force larger than the weight of the inertia mass portion. Accordingly, the evaluation accuracy of the thread surface friction coefficient and the seat surface friction coefficient can be improved with enhanced operating efficiency, while permitting the wrenching apparatus to be relatively light.

The laminar piezoelectric element 284 may be controlled to be energized once in each of the initial and intermediate stages. Since the time duration of the initial stage is comparatively long, the piezoelectric element 284 can be relatively easily energized for elongation within the initial stage. However, since the time duration of the intermediate stage is comparatively short, it is necessary to detect the initiation of the intermediate stage and then energize the piezoelectric element 284 so that the element 284 is elongated once within the intermediate stage. The initiation of the intermediate stage may be detected in the manner described below, for example.

The weight of the inertia mass portion acts on the rotary threaded member even while the length changeable device 278 is at rest. Therefore, an abrupt change of the wrenching torque due to abutting contact of the seat surfaces can be detected by detecting an abrupt change of the output signal of the torque detecting portion of the detector 24. The axial movement of the rotary threaded member, that is, the axial movement of the inertia mass portion is suddenly stopped upon abutting contact of the seat surfaces of the rotary threaded member and the workpiece to be fastened. At this time, the compressive force acting on the length changeable device 278 is increased. The transition from the initial stage to the intermediate stage can be detected by detecting this increase of the compressive force, which can be detected by the piezoelectric element 284. To this end, a part of the piezoelectric element 284 is employed exclusively for detecting the compressive force acting on the length changeable device 278. Alternatively, the piezoelectric element 284 is adapted to normally detect the compressive force, namely, to detect an abrupt increase of the compressive force, and is also adapted to be energized and elongated after the detection of the initiation of the intermediate stage, for utilizing the inertial force of the inertia mass portion to temporarily increase the compressive force acting on the rotary threaded member, so that the seat surface friction coefficient can be evaluated with high accuracy, based on the output of the torque detecting portion of the detector 24.

As described above, the laminar piezoelectric element 284 is partially or entirely utilized as the compressive force detecting means. Therefore, the axial force detecting portion of the detector 24 may be eliminated.

Figure 23:
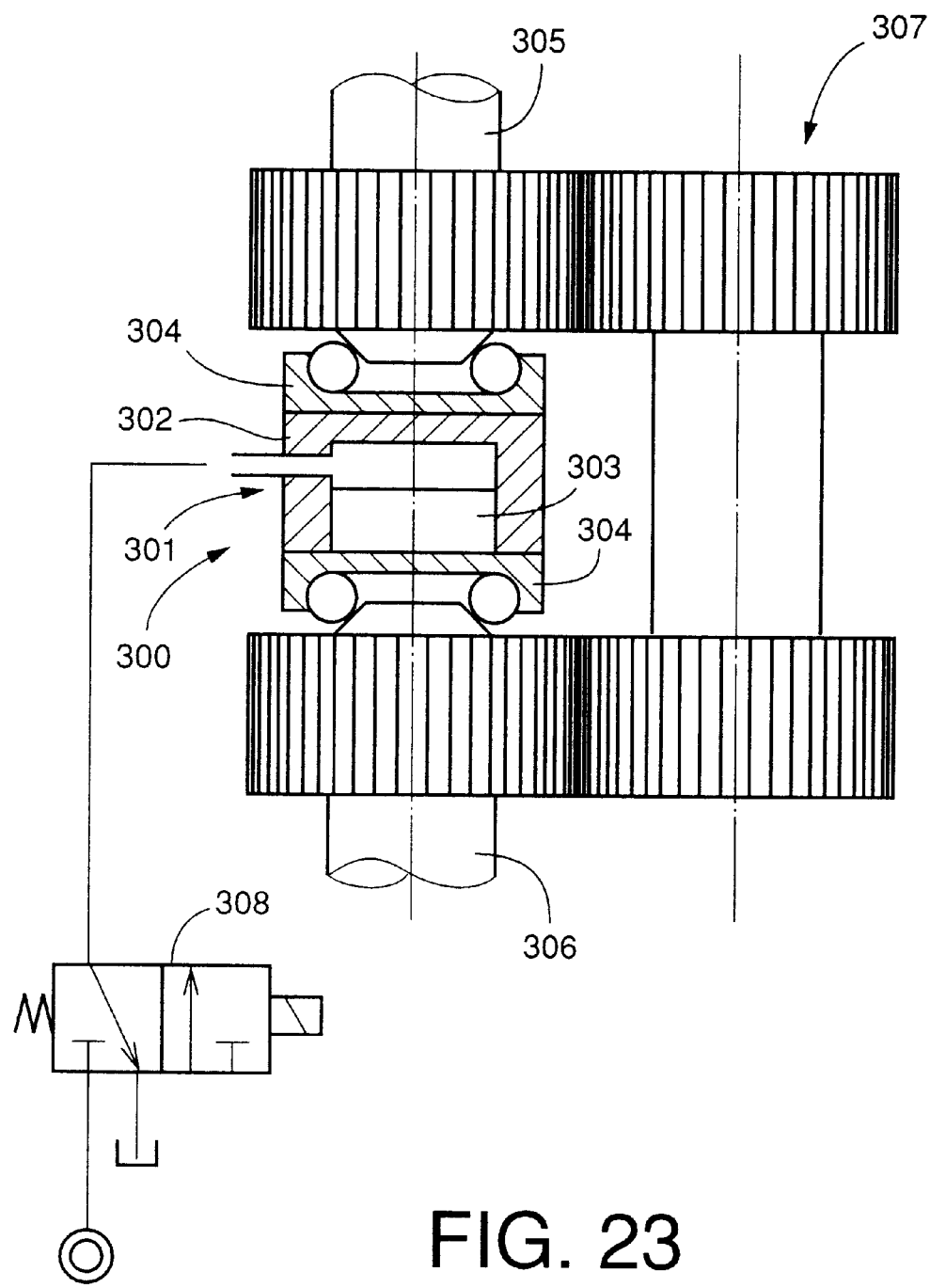
FIG. 23 is an elevational view partly in cross section showing a length changeable device in a wrenching apparatus constructed according to a thirteenth embodiment of the invention.

Referring to FIG. 23, another form of the length changeable device according to a thirteenth embodiment of the invention will be described. This length changeable device, indicated generally at 300 in FIG. 23, includes a hydraulic cylinder 301 which has a cylinder 302 and a piston 303 cooperating to define a fluid chamber. The cylinder 302 and the piston 303 are rotatably supported by a motor shaft 305 and an output shaft 306, respectively, via respective thrust bearings 304. A rotary motion of the motor shaft 305 is transmitted to the output shaft 306 through a gear mechanism 307. Axial force is transmitted between the motor shaft 305 and the output shaft 306 through the thrust bearings 304 and the hydraulic cylinder 301, while a torque is transmitted between the motor and output shafts 305, 306 through the gear mechanism 307. It will be understood that the gear mechanism 307 functions as a rotation transmitting device for transmitting the torque between the motor and output shafts 305, 306 while permitting a relative movement therebetween. In a wrenching operation, a reaction force applied from the wrench member to the rotary threaded member forces the output shaft 306 toward the motor shaft 305, causing the piston 303 to be placed in its fully retracted position, whereby the length changeable device 300 has the smallest length. When it becomes necessary to increase the length of the length changeable device 300, a control valve in the form of a solenoid-operated directional control valve 308 is energized for a predetermined short time, to supply the fluid chamber of the hydraulic cylinder 301 with a suitable amount of a pressurized fluid delivered from an external pressure source. Thus, the length of the length changeable device 300 is increased by a predetermined amount by a movement of the piston 303 toward the fully advanced position. Then, the solenoid-operated directional control valve 308 is de-energized to permit the pressurized fluid to be discharged from the hydraulic cylinder 301, permitting the length changeable device 300 to have the original length.

Figure 24:
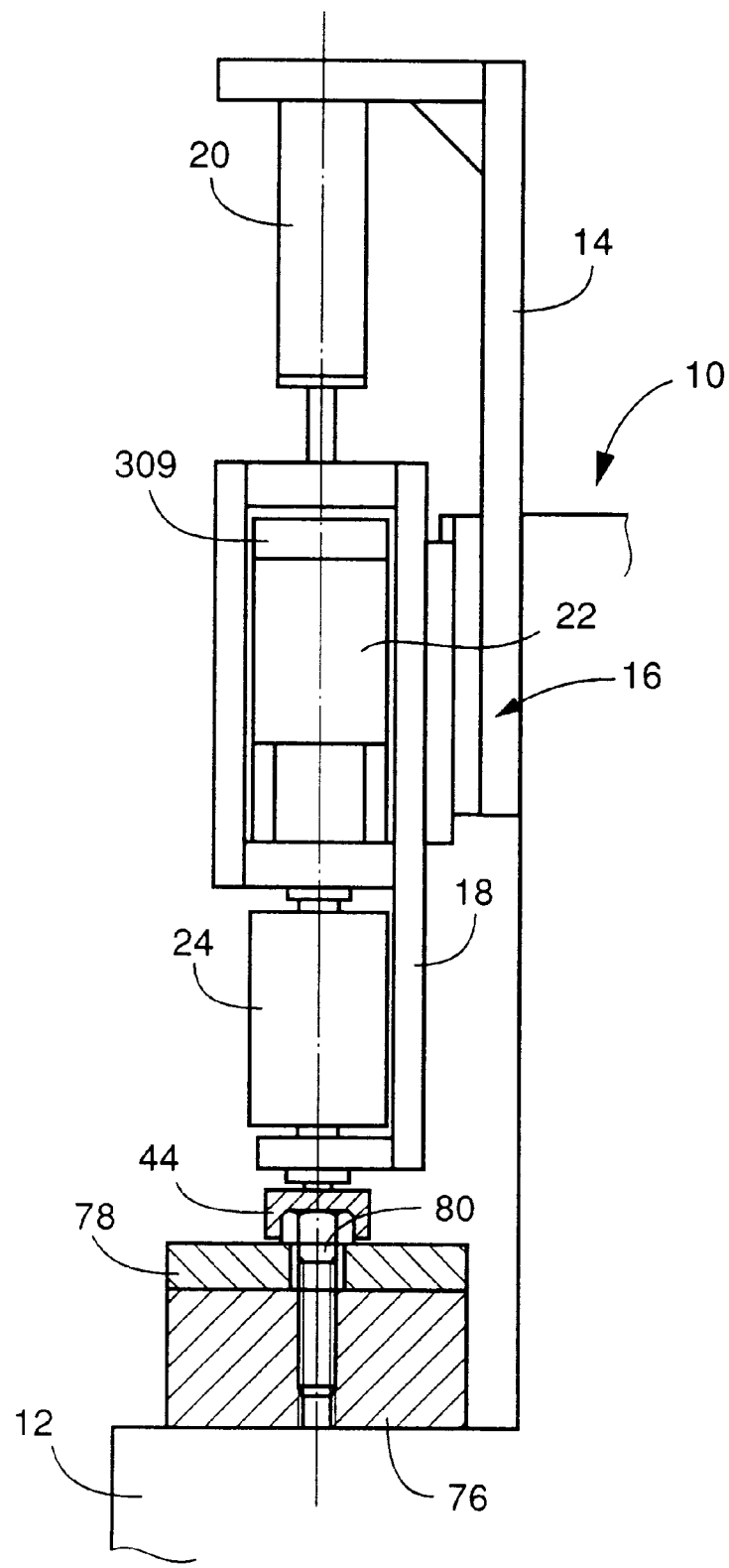
FIG. 24 is an elevational view showing a wrenching apparatus constructed according to a fourteenth embodiment of the invention.
Figure 25:
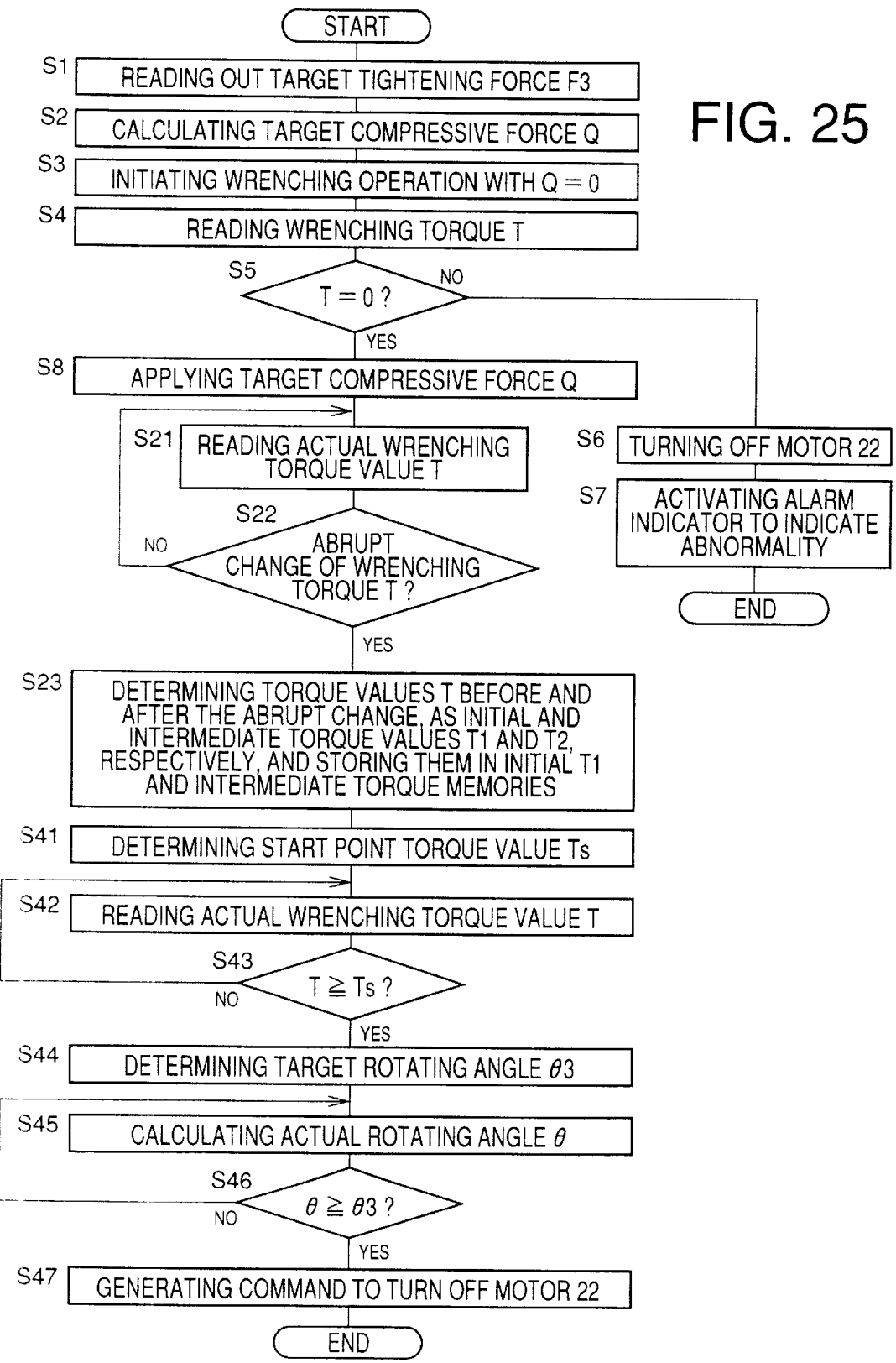
FIG. 25 is a fragmentary flow chart illustrating a part of a wrenching torque control routine executed in the embodiment of FIG. 24.

In the illustrated embodiments described above, the wrenching torque is controlled according to the "calibrated wrench tightening method", it may be controlled according to the "turn of nut tightening method". In this case, the motor 22 of the wrenching apparatus of FIG. 1 is provided with an encoder 309 as shown in FIG. 24, according to a fourteenth embodiment of this invention, and the wrenching torque can be controlled according to a torque control routine illustrated in the flow chart of FIG. 25. This routine is identical with the routine of FIG. 13, with respect to steps S1–S23. In the routine of FIG. 24, step S23 in which the initial and intermediate torque values T1, T2 are determined is followed by step S41 to determine a start point torque value Ts, according to the above-indicated equation (3), based on the coefficients $\xi$, $\eta$, $\zeta$ and a start point axial force Fs. For instance, the start point axial force Fs is obtained by multiplying the target tightening or clamping force F3 by a predetermined coefficient, which is selected within a range of 0.03–0.30, preferably, within a range of 0.05–0.15. Then, the control flow goes to step S42 to read the actual wrenching torque value T, and to step S43 to determine whether the detected torque value T has increased to the determined start point torque value Ts. If an affirmative decision (YES) is obtained in step S43, the control flow then goes to step S44 to determine a target angle $\theta 3$ of rotation of the rotary threaded member after the determined start torque Ts has been reached. This determination of the target rotation angle $\theta 3$ is effected according to the following equation (4):

$$\theta 3 = (F3 - Fs)/\phi \tag{4}$$

$$Fs = (Ts + \eta \cdot Q)/(\eta + \xi + \zeta)$$

$$\phi = (p \cdot Kb \cdot Kc)/[2\pi \cdot ]Kb + Kc)$$

wherein "Kb" and "Kc" represent tensile spring constants of the bolt system and the workpiece system, respectively.

Then, step S45 is implemented to calculate the actual angle $\theta$ of rotation of the socket wrench 44 on the basis of the output signal of the encoder 309. Step S45 is followed by step S46 to determine whether the detected angle $\theta$ has reached the target value $\theta 3$. Steps S45 and S46 are repeatedly implemented until an affirmative decision (YES) is obtained in step s46. When the affirmative decision is obtained in step S46, the control flow goes to step S47 in which a command to turn off the motor 22 is generated. In the present embodiment, the start point, axial force Fs used to determine the start point torque value Ts is made equal to a snug point torque value according to the conventional "turn of nut tightening" method. The snug point value corresponds to a snug point located at a smaller-side end portion of a straight portion of a $\theta$–F line representative of a relationship between the tightening force F and the angle of rotation $\theta$ of the rotary threaded member. The smaller-side end portion corresponds to the smallest value of the tightening torque above which the tightening torque linearly increases with the angle of rotation of the rotary threaded member.

Figure 28:
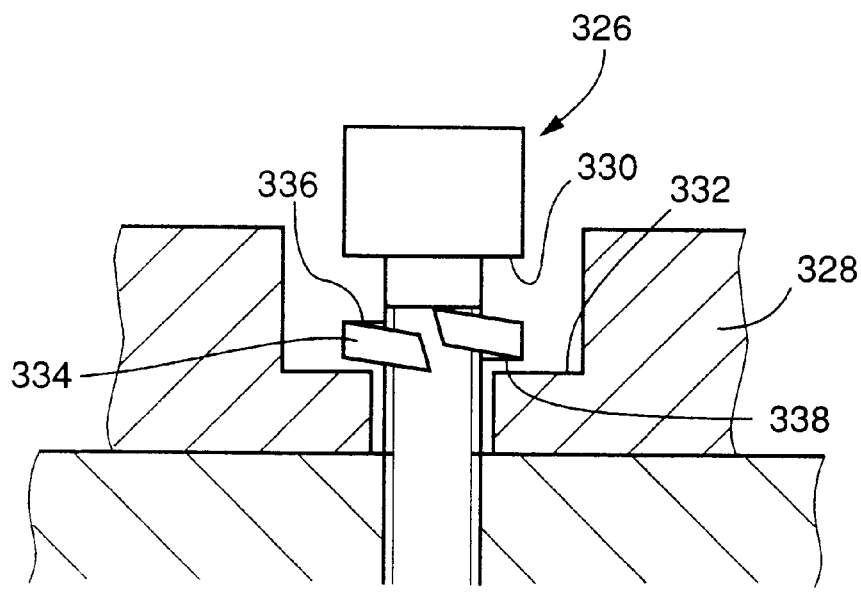
FIG. 28 is an elevational view showing a bolt and a spring washer used for tightening a workpiece according to a method of the invention.

Although the embodiment described above is adapted to determine the start point torque value Ts on the basis of the coefficient $\xi$ as a quantity relating to the thread surface friction coefficient, and the coefficient $\eta$ as a quantity relating to the seat surface friction coefficient, the start point torque value Ts can be determined by detecting a point of time at which the wrenching torque starts to be increased at the boundary of the intermediate and final stage of a wrenching operation. Namely, the transition from the intermediate stage to the final stage can be detected by measuring the wrenching torque in the intermediate stage while the rotary threaded member is rotated with an axial force larger than a predetermined value being applied thereto. The point of time at which the measured wrenching torque starts to be increased can be determined as the point of time at which the final stage is initiated. Where a spring washer 334 is interposed between a seat surface 330 of the rotary threaded member in the form of a bolt 326 and a seat surface 332 of a workpiece 328, as shown in FIG. 28, the wrenching torque T is measured during rotation of the bolt 326 while applying to the bolt 326 a compressive force which is sufficient for deforming the spring washer 334 into a plane washer, so that seat surfaces 336, 338 of the spring washer 334 are held in close contact with the respective seat surfaces 330, 332. The wrenching torque T thus measured varies as shown in the graph of FIG. 11. That is, the wrenching torque T, which has been held substantially constant at the intermediate value T2, begins to increase upon termination of the intermediate stage. The rate of increase of the wrenching torque T upon transition from the intermediate stage to the final stage is considerably higher in the present arrangement in which the sufficiently large compressive force is applied to the bolt 326, than in the conventional arrangement in which the compressive force applied is not so large. Therefore, the snug point near the point of time at which the wrenching torque T starts increasing can be accurately determined. For instance, the snug point may be a first point at which the rate of increase of the wrenching torque T exceeds a predetermined threshold for the first time, or a second point at which the wrenching torque T has increased by a predetermined amount from the value at the first point. Accordingly, the accuracy of control of the tightening force according to the turn of nut tightening method can be improved. The wrenching apparatuses of FIGS. 1, 15, 16, 18, etc. can be used to practice the present wrenching or tightening method.

The accuracy of detection of the snug point can be further improved if the transition from the intermediate stage to the final stage is determined based on an abrupt increase of the wrenching torque T after (or predetermined time after) an abrupt change of the wrenching torque upon transition from the initial stage to the intermediate stage.

Figure 26:
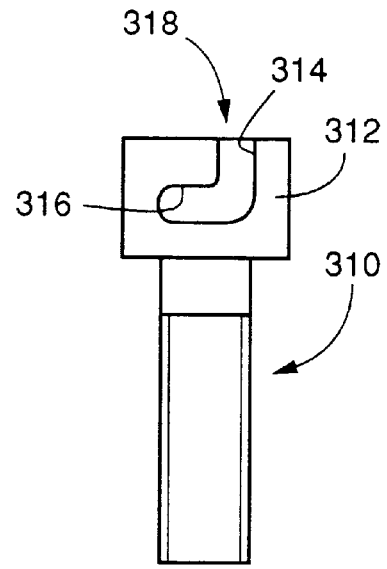
FIG. 26 is an elevational view showing a bolt tightened by a wrenching apparatus constructed according to a fifteenth embodiment of the invention.
Figure 27:
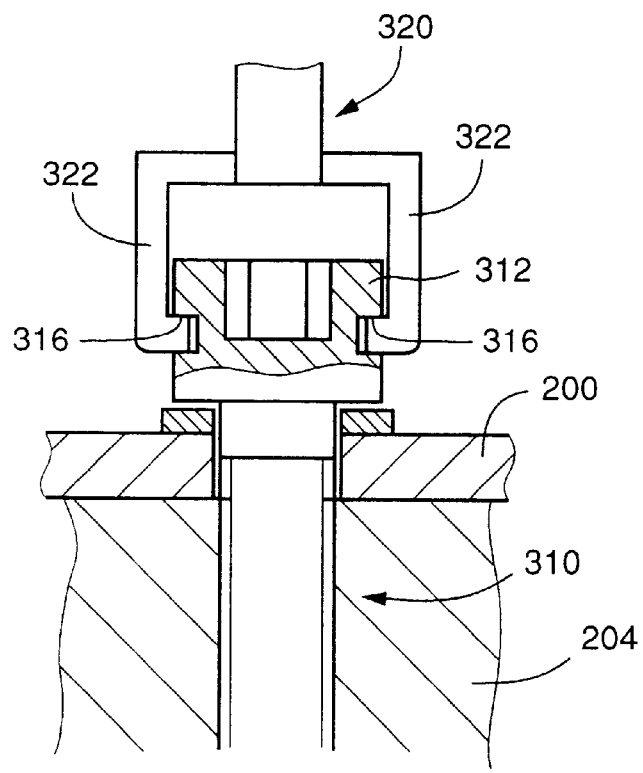
FIG. 27 is an elevational view in cross section showing the bolt of FIG. 24 under tightening.

While the preceding embodiments are adapted to evaluate the thread surface friction coefficient by rotating the rotary threaded member while a compressive force acts on this rotary threaded member, the evaluation of the thread surface friction coefficient may be accomplished while a tensile force acts on the rotary threaded member. For instance, this modification may be achieved according to a fifteen embodiment of the invention, which uses a bolt 310 as shown in FIG. 26 and an engaging portion 322 as shown in FIG. 27. Namely, a head 312 of the bolt 310 is formed with at least one L-shaped engaging cutout 318 each consisting of an axial groove 314 and a circumferential groove 316. The axial groove 314 extends from the top face of the head 312 in the axial direction of the bolt 310, while the circumferential groove 316 extends from the end of the axial groove in the rotating direction of the bolt 310. It is desirable to provide a plurality of such L-shaped engaging cutouts 318 formed symmetrically with respect to the axis of the bolt 310. Further, a wrench member 320 is provided with the above-indicated engaging portion 322, which is engageable with the L-shaped engaging cutout 318. The engaging portion 322 has an end portion which is slidable through the axial groove 314 into the circumferential groove 316. The engaging portion 322 engaging the cutout 318 permits a tensile force and a wrenching torque to be applied to the bolt 310. In this case, the wrenching apparatus may be constructed as shown in FIG. 19, with the electromagnet 214 used as an abutting portion adapted to abut on the workpiece

200. To evaluate the thread surface friction coefficient, the motor 22 is operated to rotate the bolt 310 in the wrenching direction while the fluid-operated cylinder 165 is operated so as to pull up the wrench member 320, and the wrenching torque is detected to evaluate the friction coefficient.

In the preceding embodiments of FIGS. 4, 12–14 and 25, abnormality of thread engagement of the rotary and stationary threaded members due to a foreign matter present between the thread surfaces is detected by determining whether the wrenching torque T detected while the axial force Q is substantially zero is substantially zero or not. More specifically, some abnormality relating to the thread engagement is detected if the wrenching torque T is not substantially zero. However, it is possible to detect such thread engagement abnormality without substantially zeroing the axial force. One example of this arrangement according to a sixteenth embodiment of the invention will be explained by reference to the graph of FIG. 29.

Figure 29:
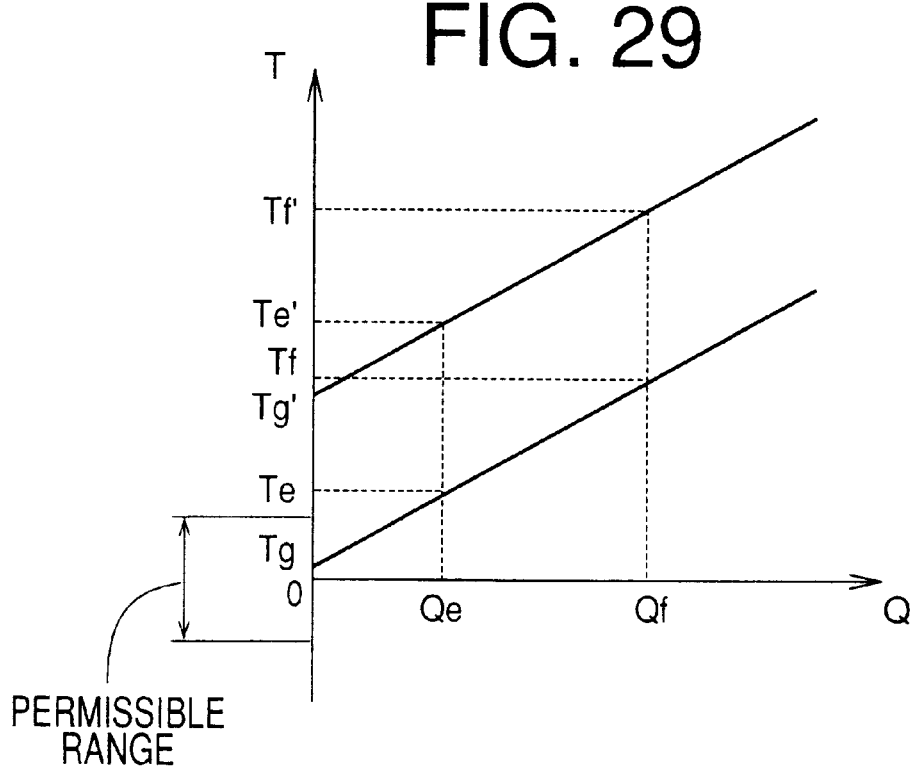
FIG. 29 is a graph for explaining detection of thread engagement abnormality in a wrenching apparatus constructed according to a sixteenth embodiment of this invention.

Namely, the axial force Q is changed to different values Qe, Qf, etc., to obtain the corresponding wrenching torque values Te, Tf, etc. Based on the obtained torque values Te, Tf, etc., a wrenching torque value Tg when the axial force Q is zero is calculated by extrapolation. A permissible range of the wrenching torque T when the axial force Q is zero is predetermined such that the range includes zero, as indicated in FIG. 29. If the absolute value of the torque value Tg is within the permissible range, the control device determines that there does not exists any thread engagement abnormality. If the absolute value is outside the permissible range, the control device determines that some thread engagement abnormality exists. In the presence of some thread engagement abnormality, the wrenching torque values Te', Tf' correspond to the axial force values Qe, Qf, respectively. The rate of change of the wrenching torque T' with the axial force Q in the presence of the thread engagement abnormality is substantially the same as that in the absence of any thread engagement abnormality, as indicated in the graph. That is, a straight line defined by the abnormal values Te', Tf' is parallel to and is located above a straight line defined by the normal values Te, Tf, so that an abnormal wrenching torque value Tg' when the axial force Q is zero is larger than the upper limit of the predetermined permissible range. Thus, the thread engagement abnormality can be detected without zeroing the axial force Q.

It is noted that a washer or washers interposed between the workpiece and the rotary threaded member is/are conventionally used to avoid loosening of the rotary threaded member, which may occur when the tightening force of the workpiece is not proper and which may cause a fatigue failure of associated component or components. Accordingly, the use of washers such as spring washers may not be essential according to the principle of the invention.

While the wrenching apparatus according to each of the various embodiments of the invention described above is controlled by an exclusive microcomputer, a plurality of wrenching apparatuses may be controlled by a single common personal computer or work station, for integrated or coordinate control of the wrenching forces of the apparatuses. Further, the microcomputer may be replaced by electronic or electric circuits.

While the present invention has been described in detail in its presently preferred embodiments, it is to be understood that the invention may be embodied with various changes, modifications and improvements, which may occur to those skilled in the art, in the light of the foregoing teachings.

What is claimed is:

1. A method of tightening a workpiece between an externally threaded member and an internally threaded member, by rotating a rotary threaded member which is one of said externally and internally threaded members, while said externally and internally threaded members are held in engagement with each other and while a stationary threaded member which is the other of said externally and internally threaded members is prevented from being rotated, said method comprising:

detecting an actual initial value of a wrenching torque acting on said rotary threaded member while said rotary threaded member is rotated with an axial force acting thereon, in an initial stage of a wrenching operation in which a seat surface of said rotary threaded member is spaced apart from a seat surface of said workpiece;

determining a terminating condition for terminating said wrenching operation, on the basis of the detected actual initial value of the wrenching torque; and terminating said wrenching operation when said terminating condition is satisfied.

2. A method according to claim 1, wherein said axial force is a compressive force acting on said rotary threaded member in such a direction that would cause said seat surface of said rotary threaded member to move toward said seat surface of said workpiece.

3. A method according to claim 2, further comprising the step of detecting an actual intermediate value of the wrenching torque acting on said rotary threaded member in an intermediate stage of the wrenching operation in which said seat surface of said rotary threaded member is in contact with said seat surface of said workpiece while thread surfaces of said externally and internally threaded members are substantially spaced apart from each other, and wherein said step of determining a terminating condition comprises determining said terminating condition, on the basis of said actual intermediate value of the wrenching torque detected in said intermediate stage as well as said actual initial value of the wrenching torque detected in said initial stage.

4. A method according to claim 1, wherein said terminating condition is that the actual value of the wrenching torque has increased to a target value determined on the basis of at least the actual value detected in said initial stage.

5. A method according to claim 1, wherein said terminating condition is that an actual value of an angle of rotation of said rotary threaded member from a point of time at which the actual value of the wrenching torque has reached a start torque value determined based on the actual initial value in said initial stage has increased to a target value determined on the basis of elastic coefficients of said externally threaded member and said workpiece and a target tightening force by which said workpiece is tightened between said externally and internally threaded members.

6. A method according to claim 1, wherein said rotary threaded member is rotated by a wrench member to tighten said workpiece while a casing holding said wrench member such that said wrench member is rotated with said rotary threaded member is in engagement with said workpiece such that a reaction force of said axial force applied from said wrench member to said rotary threaded member is transmitted to said workpiece.

7. A method according to claim 2, wherein said workpiece is tightened by and between a plurality of sets of said externally and internally threaded members, the method comprising the steps of: provisionally tightening said rotary threaded member of each of at least one of said plurality of sets of the externally and internally threaded members; tightening at least one of the other sets of the externally and internally threaded members according to the method defined in claim 2, such that a casing which holds a wrench member such that said wrench member is rotated with said rotary threaded member is in engagement with said workpiece such that a reaction force of said axial force applied from said wrench member to said rotary threaded member is transmitted to said workpiece; loosening the provisionally tightened rotary threaded member of each of said at least one of said plurality of sets of the externally and internally threaded members; and re-tightening the loosened rotary threaded member of each of said at least one of said plurality of sets of the externally and internally threaded members, according to the method defined in claim 2.

8. A method according to claim 1, further comprising estimating a coefficent of friction between thread surfaces of said externally and internally threaded members on the basis of the detected actual initial value of the wrenching torque and said axial force acting on said rotary threaded member, wherein said terminating condition is determined on the basis of the estimated coefficient of friction between said thread surfaces of said externally and internally threaded members.

9. An apparatus for tightening a workpiece between an externally threaded member and an internally threaded member, by rotating a rotary threaded member which is one of said externally and internally threaded members, while said externally and internally threaded members are held in engagement with each other and while a stationary threaded member which is the other of said externally and internally threaded members is prevented from being rotated, said apparatus comprising:

a rotary driving device for rotating said rotary threaded member;

an axial force applying device for applying an axial force to said rotary threaded member, at least one point of time in an initial stage of a wrenching operation in which said rotary threaded member is rotated by said rotary driving device while a seat surface of said rotary threaded member is spaced apart from a seat surface of said workpiece;

a torque detecting device for detecting an actual value of a wrenching torque acting on said rotary threaded member while said axial force is applied to said rotary threaded member;

terminating condition determining means for determining a terminating condition for terminating said wrenching operation, on the basis of an actual initial value of the wrenching torque detected by said torque detecting device in said initial stage; and termination commanding means for generating a terminating command for turning off said rotary driving device when said terminating condition determined by said terminating condition determining means is satisfied.

10. An apparatus according to claim 9, wherein said axial force applying device applies as said axial force a compressive force to said rotary threaded member in such a direction that would cause said seat surface of said rotary threaded member to move toward said seat surface of said workpiece.

11. An apparatus according to claim 10, wherein said axial force applying device applies an axial force to said rotary threaded member, also at at least one point of time in an intermediate stage of the wrenching operation in which said seat surfaces of said rotary threaded member and said workpiece are in contact with each other while thread surfaces of said externally and internally threaded members are substantially spaced apart from each other, and said torque detecting device detects an actual intermediate value of the wrenching torque at said at least one point of time in said intermediate stage, said terminating condition determining means determining said terminating condition on the basis of said actual intermediate value as well as said actual initial value.

12. An apparatus according to claim 9, wherein said terminating condition determining means comprises means for determining whether the actual value of the wrenching torque has increased to a target value determined on the basis of said actual initial value of the wrenching torque detected in said initial stage.

13. An apparatus according to claim 9, wherein said terminating condition determining means comprises means for determining whether an actual value of an angle of rotation of said rotary threaded member from a point of time at which the actual value of the wrenching torque has reached a start torque value determined based on the actual initial value in said initial stage has increased to a target value determined on the basis of elastic coefficients of said externally threaded member and said workpiece and a target tightening force by which said workpiece is tightened between said externally and internally threaded members.

14. An apparatus according to claim 11, further comprising intermediate stage detecting means for detecting at least one point of time in said intermediate stage.

15. An apparatus according to claim 14, wherein said intermediate stage detecting means comprises means for detecting said at least one point of time in said intermediate stage, on the basis of the actual value of the wrenching torque detected by said torque detecting device.

16. An apparatus according to claim 15, wherein said intermediate stage detecting means comprises means for detecting an abrupt change in the actual value of the wrenching torque which takes place upon transition from said initial stage to said intermediate stage, and thereby detecting a point of initiation of said intermediate stage upon detection of said abrupt change.

17. An apparatus according to claim 15, wherein said intermediate stage detecting means comprises:

a torque memory for storing the actual values of the wrenching torque successively detected by said torque detecting device; and intermediate stage termination determining means for determining a point of termination of said intermediate stage, on the basis of a group of the actual values of the wrenching torque which have been stored in said torque memory before a current value of the wrenching torque has reached a predetermined value, said intermediate stage termination determining means determining said point of termination after said current value has reached said predetermined value.

18. An apparatus according to claim 9, wherein said terminating condition determining means comprises friction coefficient estimating means for estimating at least one of a coefficient of friction between thread surfaces of said externally and internally threaded members and a coefficient of friction between said seat surfaces of said rotary threaded member and said workpiece, on the basis of said actual value of the wrenching torque detected by said torque detecting device and said axial force applied to the rotary threaded member by said axial force applying means, and wherein said terminating condition determining means determines said terminating condition on the basis of said at least one of the coefficients of friction estimated by said friction coefficient estimating means.

19. An apparatus according to claim 18, further comprising an axial force detecting device for detecting said axial force applied to said rotary threaded member by said axial force applying device, and said friction coefficient estimating means estimates said at least one of the coefficients of friction, on the basis of said axial force detected by said axial force detecting device and said actual value of the wrenching torque detected by said torque detecting device.

20. An apparatus according to claim 9, wherein said rotary driving device comprises a wrench member engageable with with said rotary threaded member for rotation therewith, and a rotary drive source for rotating said wrench member.

21. An apparatus according to claim 20, wherein said axial force applying device comprises:
- a reaction force receiving member which is immovable relative to said stationary threaded member in an axial direction of said externally and internally threaded members, at least when said wrenching operation is performed with said rotary threaded member being rotated; and
- an axial driving device disposed between said reaction force receiving member and said wrench member, for moving said reaction force receiving member and said wrench member relative to each other in said axial direction.

22. An apparatus according to claim 21, wherein said reaction force receiving member is engageable with one of said stationary threaded member and said workpiece, such that a reaction force of said axial force applied to said rotary threaded member through said wrench member is transmitted to said one of said stationary threaded member and said workpiece.

23. An apparatus according to claim 22, wherein said reaction force receiving member comprises a mechanical engaging portion which is mechanically engageable with one of said stationary threaded member and said workpiece.

24. An apparatus according to claim 22, wherein said reaction force receiving member comprises a vacuum engaging portion which is fixed under vacuum to one of said stationary threaded member and said workpiece.

25. An apparatus according to claim 22, wherein said reaction force receiving member comprises a magnetic engaging portion which is fixed with a magnetic force to one of said stationary threaded member and said workpiece.

26. An apparatus according to claim 20, wherein said axial force applying device comprises:
- a load balancer operable to suspend a mass consisting of said wrench member and all members which are moved with said wrench member, with a suspending force substantially equal to a weight of said mass; and
- a balancer releasing device for releasing an operation of said load balancer.

27. An apparatus according to claim 20, wherein said axial force applying device comprises:
- a length changing device disposed between at least a portion of the apparatus and said wrench member, and having a length which is changeable; and
- control device for changing said length of said length changing device at least once in at least one of said initial and intermediate stages of the wrenching operation.

28. An apparatus according to claim 20, wherein said rotary driving source comprises an electric motor.

29. An apparatus according to claim 28, wherein said torque detecting device detects the actual value of the wrenching toque on the basis of an electric current of said electric motor.

30. An apparatus according to claim 20, wherein said rotary driving source comprises an air motor.

31. An apparatus according to claim 20, wherein said rotary driving device comprises an impact torque applying device for applying an impact torque to said wrench member while transmitting a rotary motion of said rotary driving source to said rotary threaded member.

32. An apparatus according to claim 9, further comprising abnormality detecting means for detecting an abnormality relating to engagement of said externally and internally threaded members, on the basis of said wrenching torque detected by said torque detecting device in an initial portion of said initial stage.

33. An attachment attachable to a wrenching apparatus for tightening a workpiece between an externally threaded member and an internally threaded member, by applying an axial force to a rotary threaded member which is one of said externally threaded member and said internally threaded member, said wrenching apparatus including a casing, a wrench member rotatably supported by said casing, and a rotary driving device for rotating said wrench member while it is in engagement with said rotary threaded member, so that said rotary threaded member is rotated by said wrench member while a stationary threaded member which is the other of said externally and internally threaded members is prevented from being rotated, said attachment comprising:
- an auxiliary casing attached to said casing of said wrenching apparatus;
- a rotation transmitting member rotatably supported by said auxiliary casing and including a connecting portion at a rear end thereof and a wrenching portion at a front end thereof, said connecting portion engaging said wrench member for rotation therewith, and said wrenching portion being engageable with said rotary threaded member for rotating said rotary threaded member;
- a torque detecting device for detecting a torsional torque of said rotation transmitting member; and
  - a control device connected to said torque detecting device and including (i) terminating condition determining means for determining a terminating condition on the basis of an actual initial value of a wrenching torque which is said torsional torque detected by said torque detecting device in an initial stage of a wrenching operation in which at least a seat surface of said rotary threaded member is spaced apart from a seat surface of said workpiece, and (ii) termination commanding means for generating a terminating command for turning off said rotary driving device when said terminating condition determined by said terminating condition determining means is satisfied.

34. An attachment according to claim 33, wherein said terminating condition determining means comprises friction coefficient estimating means for establishing at least one of a coefficient of friction between thread surfaces of said externally and internally threaded members and a coefficient of friction between said seat surfaces of said rotary threaded member and said workpiece, on the basis of said torsional torque of said rotation transmitting member detected by said torque detecting device and said axial force applied to said rotary threaded member, and said terminating condition determining means determines said terminating condition on the basis of said at least one of said coefficients of friction estimated by said friction coefficient estimating means.

35. A recording medium readable by a computer and storing a wrenching torque control program executed by said computer in a wrenching operation in which a workpiece is tightened between an externally threaded member and an internally threaded member, by rotating a rotary threaded member which is one of said externally and internally threaded members, while said externally and internally threaded members are in engagement with each other and while a stationary threaded member which is the other of said externally and internally threaded members is prevented from being rotated, said wrenching torque control program comprising:

a step of detecting an actual initial value of a wrenching toque acting on said rotary threaded member while said rotary threaded member is rotated with an axial force acting thereon, in an initial stage of a wrenching operation in which a seat surface of said rotary threaded member is spaced apart from a seat surface of said workpiece;

a step of determining a terminating condition for terminating said wrenching operation, on the basis of the detected actual initial value of the wrenching torque; and a step of terminating said wrenching operation when said terminating condition is satisfied.

36. A recording medium according to claim 35, wherein said wrenching control program further comprises a step of estimating a coefficient of friction between thread surfaces of said externally and internally threaded members, on the basis of said actual initial value of said wrenching torque and said axial force acting on said rotary threaded member, and said terminating condition is determined on the basis of the estimated coefficient of friction between said thread surfaces of said externally and internally threaded members.

37. A method of obtaining a quantity relating to a coefficient of friction between thread surfaces of an externally threaded member and an internally threaded member, in a wrenching operation in which a workpiece is tightened between said externally and internally threaded members, by rotating a rotary threaded member which is one of said externally and internally threaded members, while said externally and internally threaded members are in engagement with each other and while a stationary threaded member which is the other of said externally and internally threaded members is prevented from being rotated, said method comprising:

detecting an actual value of a wrenching torque acting on said rotary threaded member while said rotary threaded member is rotated with an axial force acting thereon, in an initial stage of said wrenching operation in which a seat surface of said rotary threaded member is spaced part from a seat surface of said workpiece; and calculating said quantity on the basis of said axial force and said actual value of said wrenching torque.

38. An apparatus for obtaining a quantity relating to a coefficient of friction between thread surfaces of an externally threaded member and an internally threaded member, in a wrenching operation in which a workpiece is tightened between said externally and internally threaded members, by rotating a rotary threaded member which is one of said externally and internally threaded members, while said externally and internally threaded members are in engagement with each other and while a stationary thread member which is the other of said externally and internally threaded members is prevented from being rotated, said apparatus comprising:

a rotary driving device for rotating said rotary threaded member;

an axial force applying device for applying an axial force to said rotary threaded member, at at least one point of time in an initial stage of said wrenching operation in which said rotary threaded member is rotated by said rotary driving device while a seat surface of said rotary threaded member is spaced apart from a seat surface of said workpiece;

a torque detecting device for detecting an actual value of a wrenching torque acting on said rotary threaded member while said axial force is applied to said rotary threaded member; and means for calculating said quantity on the basis of said axial force and said actual value of said wrenching torque.

39. A method of tightening a workpiece between an externally threaded member and an internally threaded member, by rotating a rotary threaded member which is one of said externally and internally threaded members, while said externally and internally threaded members are held in engagement with each other and while a stationary threaded member which is the other of said externally and internally threaded members is prevented from being rotated, said method comprising:

detecting transition from an initial stage of a wrenching operation in which a seat surface of said rotary threaded member is spaced apart from a seat surface of said workpiece, to an intermediate stage of said wrenching operation in which said seat surface of said rotary threaded member is in contact with said seat surface of said workpiece while thread surfaces of said externally and internally threaded members are substantially spaced apart from each other;

detecting an actual value of a wrenching torque acting on said rotary threaded member while said rotary threaded member is rotated with an axial force acting thereon, in at least one of said initial stage and said intermediate stage;

determining a terminating condition for terminating said wrenching operation, on the basis of said actual value of said wrenching torque; and terminating said wrenching operation when said terminating condition is satisfied.

40. A method according to claim 39, wherein said actual value of said wrenching torque is detected at least in said initial stage and optionally in said intermediate stage, and said terminating condition is determined on the basis of at least an actual initial value which is said actual value of said wrenching torque detected in said initial stage, and optionally an actual intermediate value which is said actual value of said wrenching torque detected in said intermediate stage.

41. An apparatus for tightening a workpiece between an externally threaded member and an internally threaded member, by rotating a rotary threaded member which is one of said externally and internally threaded members, while said externally and internally threaded members are held in engagement with each other and while a stationary threaded member which is the other of said externally and internally threaded members is prevented from being rotated, said apparatus comprising:

a rotary driving device for rotating said rotary threaded member;

an axial force applying device for applying an axial force to said rotary threaded member;

means for detecting transition from an initial stage of a wrenching operation in which a seat surface of said rotary threaded member is spaced apart from a seat surface of said workpiece, to an intermediate stage of said wrenching operation in which said seat surface of said rotary threaded member is in contact with said seat surface of said workpiece while thread surfaces of said externally and internally threaded members are substantially spaced apart from each other;

a torque detecting device for detecting an actual value of a wrenching torque acting on said rotary threaded member in at least one of said initial stage and said intermediate stage, while said axial force is applied to said rotary threaded member;

terminating condition determining means for determining a terminating condition for terminating said wrenching operation, on the basis of said actual value of said wrenching torque; and termination commanding means for generating a terminating command for turning off said rotary driving device when said terminating condition determined by said terminating condition determining means is satisfied.

42. An apparatus according to claim 41, wherein said torque detecting device detects said actual value of said wrenching torque at least in said initial stage and optionally in said intermediate stage, and said terminating condition determining means determines said terminating condition on the basis of at least an actual initial value which is said actual value of said wrenching torque detected in said initial stage, and optionally an actual intermediate value which is said actual value of said wrenching torque detected in said intermediate stage.

43. An attachment attachable to a wrenching apparatus for tightening a workpiece between an externally threaded member and an internally threaded member, said wrenching apparatus including a casing, a wrench member rotatably supported by said casing, and a rotary driving device for rotating said wrench member while said wrench member is in engagement with a rotary threaded member which is one of said externally and internally threaded members, so that said rotary threaded member is rotated by said wrench member while a stationary threaded member which is the other of said externally and internally threaded members is prevented from being rotated, said attachment comprising:

an auxiliary casing attached to said casing of said wrenching apparatus;

a rotation transmitting member rotatably supported by said auxiliary casing and including a connecting portion at a rear end thereof and a wrenching portion at a front end thereof, said connecting portion engaging said wrench member for rotation therewith, and said wrenching portion being engageable with said rotary threaded member for rotating said rotary threaded member;

means for detecting transition from an initial stage of a wrenching operation in which a seat surface of said rotary threaded member is spaced apart from a seat surface of said workpiece, to an intermediate stage of said wrenching operation in which said seat surface of said rotary threaded member is in contact with said seat surface of said workpiece while thread surfaces of said externally and internally threaded members are substantially spaced apart from each other;

a torque detecting device for detecting a torsional torque of said rotation transmitting member at least in said initial stage and optionally in said intermediate stage; and a control device connected to said torque detecting device and including (i) terminating condition determining means for determining a terminating condition on the basis of at least an initial torsional torque which is said torsional torque detected in said initial stage, and optionally an intermediate torsional torque which is said torsional torque detected in said intermediate stage, and (ii) termination commanding means for generating a terminating command for turning off said rotary driving device when said terminating condition determined by said terminating condition determining means is satisfied.

44. A recording medium readable by a computer and storing a wrenching torque control program executed by said computer in a wrenching operation in which a workpiece is tightened between an externally threaded member and an internally threaded member, by rotating a rotary threaded member which is one of said externally and internally threaded members, while said externally and internally threaded members are in engagement with each other and while a stationary threaded member which is the other of said externally and internally threaded members is prevented from being rotated, said wrenching torque control program comprising:

a step of detecting transition from an initial stage of a wrenching operation in which a seat surface of said rotary threaded member is spaced apart from a seat surface of said workpiece, to an intermediate stage of said wrenching operation in which said seat surface of said rotary threaded member is in contact with said seat surface of said workpiece while thread surfaces of said externally and internally threaded members are substantially spaced apart from each other;

a step of detecting an actual value of a wrenching torque acting on said rotary threaded member while said rotary threaded member is rotated with an axial force acting thereon, in at least one of said initial stage and said intermediate stage;

a step of determining a terminating condition for terminating said wrenching operation, on the basis of said actual value of said wrenching torque; and a step of terminating said wrenching operation when said terminating condition is satisfied.

45. A recording medium according to claim 44, wherein said actual value of said wrenching torque is detected at least in said initial stage and optionally in said intermediate stage, and said terminating condition is determined on the basis of at least an actual initial value which is said actual value of said wrenching torque detected in said initial stage, and optionally an actual intermediate value which is said actual value of said wrenching torque detected in said intermediate stage.

46. A method of obtaining at least one of a quantity relating to a coefficient of friction between a thread surface of an externally threaded member and a thread surface of an internally threaded member, and a quantity relating to a coefficient of friction between a seat surface of a workpiece and a seat surface of a rotary threaded member which is one of said externally and internally threaded members, in a wrenching operation in which said workpiece is tightened between said externally and internally threaded members, by rotating said rotary threaded member, while said externally and internally threaded members are in engagement with each other and while a stationary threaded member which is the other of said externally and internally threaded members is prevented from being rotated, said method comprising:

detecting transition from an initial stage of said wrenching operation in which a seat surface of said rotary threaded member is spaced apart from a seat surface of said workpiece, to an intermediate stage of said wrenching operation in which said seat surface of said rotary threaded member is in contact with said seat surface of said workpiece while thread surfaces of said externally and internally threaded members are substantially spaced apart from each other; and detecting an actual value of a wrenching torque acting on said rotary threaded member while said rotary threaded member is rotated with an axial force acting thereon, in at least one of said initial stage and said intermediate stage.

47. An apparatus for obtaining at least one of a quantity relating to a coefficient of friction between a thread surface of an externally threaded member and a thread surface of an internally threaded member, and a quantity relating to a coefficient of friction between a seat surface of a workpiece and a seat surface of a rotary threaded member which is one of said externally and internally threaded members, in a wrenching operation in which said workpiece is tightened between said externally and internally threaded members, by rotating said rotary threaded member, while said externally and internally threaded members are in engagement with each other and while a stationary threaded member which is the other of said externally and internally threaded members is prevented from being rotated, said apparatus comprising:

a rotary driving device for rotating said rotary threaded member;

an axial force applying device for applying an axial force to said rotary threaded member;

means for detecting transition from an initial stage of said wrenching operation in which a seat surface of said rotary threaded member is spaced apart from a seat surface of said workpiece, to an intermediate stage of said wrenching operation in which said seat surface of said rotary threaded member is in contact with said seat surface of said workpiece while thread surfaces of said externally and internally threaded members are substantially spaced apart from each other; and a torque detecting device for detecting an actual value of a wrenching torque acting on said rotary threaded member in at least one of said initial stage and said intermediate stage, while said axial force is applied to said rotary threaded member.

* * * * *